United States Patent
Nicholson et al.

(10) Patent No.: US 11,558,589 B2
(45) Date of Patent: Jan. 17, 2023

(54) SYSTEMS, DEVICES, AND METHODS FOR DRIVING PROJECTORS

(71) Applicant: GOOGLE LLC, Mountain View, CA (US)

(72) Inventors: Stuart James Myron Nicholson, Waterloo (CA); Isaac James Deroche, Kitchener (CA); Jerrold Richard Randell, Waterloo (CA)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 16/906,314

(22) Filed: Jun. 19, 2020

(65) Prior Publication Data

US 2020/0404229 A1    Dec. 24, 2020

Related U.S. Application Data

(60) Provisional application No. 62/863,935, filed on Jun. 20, 2019.

(51) Int. Cl.
*H04N 9/31*    (2006.01)

(52) U.S. Cl.
CPC ......... *H04N 9/3135* (2013.01); *H04N 9/3126* (2013.01); *H04N 9/3179* (2013.01)

(58) Field of Classification Search
CPC .. H04N 9/3135; H04N 9/3179; H04N 9/3126; H04N 9/3188
USPC ........................................................ 348/744
See application file for complete search history.

(56) References Cited

U.S. PATENT DOCUMENTS

| | | | | |
|---|---|---|---|---|
| 7,583,851 B2* | 9/2009 | Kudo | ................. | G06T 1/60 |
| | | | | 382/254 |
| 2007/0013686 A1* | 1/2007 | Sakashita | ................. | G09G 5/14 |
| | | | | 345/204 |
| 2009/0213279 A1* | 8/2009 | Ichieda | ................. | H04N 9/3179 |
| | | | | 348/734 |
| 2011/0200254 A1* | 8/2011 | Taniguchi | ............ | G09G 3/3611 |
| | | | | 382/173 |
| 2013/0069961 A1* | 3/2013 | Ota | ................. | H04N 9/3179 |
| | | | | 345/506 |
| 2013/0222386 A1* | 8/2013 | Tannhauser | ............ | G06T 3/4038 |
| | | | | 345/428 |
| 2014/0285483 A1* | 9/2014 | Yamanaka | ................. | G06T 1/60 |
| | | | | 345/419 |
| 2015/0242704 A1* | 8/2015 | Nobori | ................. | G09G 3/002 |
| | | | | 345/589 |
| 2017/0289509 A1* | 10/2017 | Weisgerber | ............. | G06T 3/005 |
| 2019/0073091 A1* | 3/2019 | Chisholm | ............... | G06F 9/451 |

* cited by examiner

*Primary Examiner* — Michael Lee

(57) ABSTRACT

Systems, devices, and methods for driving projectors are described. The actual area projected over by a laser projector for a given pixel may not exactly match a desired projection area for the pixel, especially at edge regions of an image. In the present systems, devices, and methods, projection data is provided for at least one image to be projected by a laser projector. The projection data can include sets of alternative data sections at edge regions of the at least one image, effectively increasing resolution for the edge regions of the image. Depending on a projection pattern being used by a laser projector at a given time, select alternative data sections can be projected which closely match the actual area covered by the projection pattern, improving image quality.

18 Claims, 20 Drawing Sheets

SYSTEMS, DEVICES, AND METHODS FOR DRIVING PROJECTORS

CROSS-REFERENCE TO RELATED APPLICATIONS

This application claims the benefit of U.S. Provisional Patent Application No. 62/863,935, filed Jun. 20, 2019, titled "Systems, Devices, and Methods for Driving Projectors", the content of which is incorporate herein in its entirety by reference.

TECHNICAL FIELD

The present systems, devices, and methods generally relate to driving projectors and particularly providing and interpreting projector data, and controlling projectors.

BACKGROUND

Description of the Related Art

Laser Projectors

A projector is an optical device that projects or shines a pattern of light onto another object (e.g., onto a surface of another object, such as onto a projection screen) in order to display an image or video on that other object. A projector includes a light source, and a laser projector is a projector for which the light source comprises at least one laser. The at least one laser is temporally modulated to provide a pattern of laser light and usually at least one controllable mirror is used to spatially distribute the modulated pattern of laser light over a two-dimensional area of another object. The spatial distribution of the modulated pattern of laser light produces an image at or on the other object. In conventional laser projectors, the at least one controllable mirror may include: a single digital micromirror (e.g., a microelectromechanical system ("MEMS") based digital micromirror) that is controllably rotatable or deformable in two dimensions, or two digital micromirrors that are each controllably rotatable or deformable about a respective dimension, or a digital light processing ("DLP") chip comprising an array of digital micromirrors.

Exemplary scanning laser projector systems, implemented in the context of wearable heads-up displays, are described in at least US Patent Publication No. 2016/0349514. However, one skilled in the art will appreciate that the subject application is not limited to projectors in wearable heads-up displays. Rather the present systems, devices, and methods provide substantial improvements in image quality and resolution of laser projectors in general, which are applicable in a number of applications, including at least wall projectors, wearable heads-up displays, and scanning systems as non-limiting examples.

BRIEF SUMMARY

According to a broad aspect, the present disclosure describes a method of processing projection data by a system including at least one processor communicatively coupled to at least one non-transitory processor-readable storage medium, the method comprising: for a first row of an image raster representing an image to be projected: for a first portion of the first row: providing, by the at least one processor, a first set of at least two data sections, the at least two data sections in the first set being different representations of the first portion of the first row; storing, by the non-transitory processor-readable storage medium, the first set of at least two data sections as a first portion of the projection data; for a second portion of the first row: providing, by the at least one processor, a second set of at least one data section, the at least one data section of the second set representing the second portion of the first row; and storing, by the non-transitory processor-readable storage medium, the second set of at least one data section as a second portion of the projection data; and for a third portion of the first row: providing, by the at least one processor, a third set of at least two data sections, the at least two data sections of the third set being different representations of the third portion of the first row; and storing, by the non-transitory processor-readable storage medium, the third set of at least two data sections as a third portion of the projection data.

Providing, by the at least one processor, a first set of at least two data sections may comprise: generating, by the at least one processor, a first data section of the first set by interpolating between at least one pixel in the first portion of the first row and at least one pixel in a corresponding first portion of a row of the image raster spatially preceding the first row in the image raster; and generating, by the at least one processor, a second data section of the first set by interpolating between at least one pixel in the first portion of the first row and at least one pixel in a corresponding first portion of a row of the image raster spatially succeeding the first row in the image raster; providing, by the at least one processor, a second set of at least one data section may comprise reading, by the at least one processor, the second portion of the first row of the image raster; and providing, by the at least one processor, a third set of at least two data sections may comprise: generating, by the at least one processor, a first data section of the third set by interpolating between at least one pixel in the third portion of the first row and at least one pixel in a corresponding third portion of the row of the image raster spatially preceding the first row in the image raster; and generating, by the at least one processor, a second data section of the third set by interpolating between at least one pixel in the third portion of the first row and at least one pixel in a corresponding third portion of the row of the image raster spatially succeeding the first row in the image raster. Each operation of interpolating between at least one pixel in the first row and at least one pixel in a row of the image raster spatially preceding or spatially succeeding the first row in the image raster may include weighting pixel information of the at least one pixel in the first row more heavily than pixel information of the at least one pixel in the row preceding or succeeding the first row in the image raster.

The image raster may include a second row which spatially precedes the first row in the image raster, and a third row which spatially succeeds the first row in the image raster, each of the first row, the second row, and the third row comprising a respective first portion, a respective second portion, and a respective third portion, and providing, by the at least one processor, a first set of at least two data sections may comprise: providing, by the at least one processor, a first data section of the first set by reading, by the at least one processor, the first portion of the second row of the image raster; and providing, by the at least one processor, a second data section of the first set by reading, by the at least one processor, the first portion of the third row of the image raster; providing, by the at least one processor, a second set of at least one data section may comprise reading, by the at least one processor, the second portion of the first row of the image raster; and providing, by the at least one processor, a third set of at least two data sections may comprise: providing, by the at least one processor, a first data section of the third set by reading, by the at least one processor, the third portion of the second row of the image raster; and providing, by the at least one processor, a second data section of the third set by reading, by the at least one processor, the third portion of the third row of the image raster.

The system may include a projector, and the method may further comprise controlling, by the at least one processor, the projector to project an image based on the projection data. The system may include a communications module, and the method may further comprise transmitting, by the communications module, the projection data.

According to another broad aspect, the present disclosure describes a method of controlling a projector, the projector including at least one non-transitory processor-readable storage medium communicatively coupled to at least one processor, the method comprising: providing, by the at least one non-transitory processor-readable storage medium, projection data representing a plurality of rows of an image raster, the projection data including: a first set of at least two data sections, the at least two data sections of the first set being different representations of a first portion of a first row in the image raster; a second set of at least one data section, the at least one data section of the second set representing a second portion of the first row in the image raster; and a third set of at least two data sections, the at least two data sections of the third set being different representations of a third portion of the first row in the image raster; generating, by the at least one processor, a data stream for a first display frame, wherein generating, by the at least one processor, the data stream for the first display frame includes: reading, from the at least one non-transitory processor-readable storage medium by the at least one processor, one data section of the at least two data sections of the first set; reading, from the at least one non-transitory processor-readable storage medium by the at least one processor, the at least one data section of the second set; and reading, from the at least one non-transitory processor-readable storage medium by the at least one processor, one data section of the at least two data sections of the third set; and controlling, by the at least one processor, the projector to project an image based on the data stream for the first display frame.

The method may further comprise: generating, by the at least one processor, a data stream for a second display frame, and generating, by the at least one processor, the data stream for the second display frame may include: reading, from the at least one non-transitory processor-readable storage medium by the at least one processor, another data section of the at least two data sections of the first set; reading, from the at least one non-transitory processor-readable storage medium by the at least one processor, the at least one data section of the second set; and reading, from the at least one non-transitory processor-readable storage medium by the at least one processor, another data section of the at least two data sections of the third set; and controlling, by the at least one processor, the projector to project an image representing the content of the data stream for the second display frame. The at least two data sections in the first set may include a first data section of the first set at least partially representing an area of the image raster spatially preceding the first portion of the first row in the image raster, and a second data section of the first set at least partially representing an area of the image raster spatially succeeding the first portion of the first row in the image raster; the at least two data sections in the third set may include a first data section of the third set at least partially representing an area of the image raster spatially preceding the third portion of the first row in the image raster, and a second data section of the first set at least partially representing an area of the image raster spatially succeeding the third portion of the first row in the image raster; reading, from the at least one non-transitory processor-readable storage medium by the at least one processor, one data section of the at least two data sections of the first set may comprise reading the first data section of the first set; reading, from the at least one non-transitory processor-readable storage medium by the at least one processor, one data section of the at least two data sections of the third set may comprise reading the second data section of the third set; reading, from the at least one non-transitory processor-readable storage medium by the at least one processor, another data section of the at least two data sections of the first set may comprise reading the second data section of the first set; and reading, from the at least one non-transitory processor-readable storage medium by the at least one processor, another data section of the at least two data sections of the third set may comprise reading the first data section of the third set.

The projection data may include a respective data flag preceding each data section in the projection data; and each operation of reading a data section may comprise the at least one processor reading the respective flag which precedes the respective data section and determining that the respective data section should be read according to a projection pattern. Each of the at least two data sections in the first set may have a first predetermined size; each of the at least one data section in the second set may have a second predetermined size; each of the at least two data sections in the third set may have a third predetermined size; and each operation of reading a data section may comprise reading the respective data section according to the predetermined size of the respective data section. Each data section may be stored at a respective address in the at least one non-transitory processor-readable storage medium; and each operation of reading a data section may comprise reading the respective data section according to the address of the respective data section.

According to another broad aspect, the present disclosure describes a system for processing projection data and controlling a projector, the system including a projector, at least one processor, and at least one non-transitory processor-readable storage medium communicatively coupled to the at least one processor, the at least one non-transitory processor-readable storage medium having instructions stored thereon which when executed by the at least one processor cause the system to: for a first row of an image raster representing an image to be projected: for a first portion of the first row: provide, by the at least one processor, a first set of at least two data sections, the at least two data sections in the first set being different representations of the first portion of the first row; store, by the at least one non-transitory processor-readable storage medium, the first set of at least two data sections as a first portion of the projection data; for a second portion of the first row: provide, by the at least one processor, a second set of at least one data section, the at least one data section of the second set representing the second portion of the first row; and store, by the non-transitory processor-readable storage medium, the second set of at least one data section as a second portion of the projection data; and for a third portion of the first row: provide, by the at least one processor, a third set of at least two data sections, the at least two data sections of the third set being different representations of the third portion of the first row; and store, by the non-transitory processor-readable storage medium, the third set of at least two data sections as a third portion of the projection data; generate, by the at least one processor, a data stream for a first display frame, wherein the instructions which cause the at least one processor to generate the data stream for the first display frame cause the system to: read, from the at least one non-transitory processor-readable storage medium by the at least one processor, one data section of the at least two data sections of the first set; read, from the at least one non-transitory processor-readable storage medium by the at least one processor, the at least one data section of the second set; and read, from the at least one non-transitory processor-readable storage medium by the at least one processor, one data section of the at least two data sections of the third set; and control, by the at least one processor, the projector to project an image based on the data stream for the first display frame.

The at least one non-transitory processor-readable storage medium may have further instructions stored thereon, the further instructions when executed by the at least one processor may cause the system to: generate, by the at least one processor, a data stream for a second display frame, wherein the instructions which cause the at least one processor to generate the data stream for the second display frame cause the system to: read, from the at least one non-transitory processor-readable storage medium by the at least one processor, another data section of the at least two data sections of the first set; read, from the at least one non-transitory processor-readable storage medium by the at least one processor, the at least one data section of the second set; and read, from the at least one non-transitory processor-readable storage medium by the at least one processor, another data section of the at least two data sections of the third set; and control, by the at least one processor, the projector to project an image representing the content of the data stream for the second display frame.

The at least one processor may comprise a single unified processor.

The at least one processor may comprise a projection data processor, a control data processor, and a projection controller; the instructions stored on the at least one non-transitory processor-readable storage medium may include first instructions which when executed cause the projection data processor to provide the first set of at least two data sections, to provide the second set of at least one data section, and to provide the third set of at least two data sections; the instructions stored on the at least one non-transitory processor-readable storage medium may include second instructions which when executed cause the control data processor to generate the data stream for the first display frame, to read from the at least one non-transitory processor-readable storage medium one data section of the at least two data sections of the first set, to read from the at least one non-transitory processor-readable storage medium the at least one data section of the second set, and to read from the at least one non-transitory processor-readable storage medium one data section of the at least two data sections of the third set; and the instructions stored on the at least one non-transitory processor-readable storage medium may include third instructions which when executed cause the projector controller to control the projector to project the image based on the data stream for the first display frame. The system may further comprise: a projection data sub-system which includes the projection data processor, a first non-transitory processor-readable storage medium of the at least one non-transitory processor-readable storage medium, and a first communications module; and a control data sub-system which includes the control data processor, a second non-transitory processor-readable storage medium of the at least one non-transitory processor-readable storage medium, and a second communications module, and the projection data sub-system may be physically separate from the control data sub-system, and the first communications module and the second communications module may provide communicative coupling between the projection data sub-system and the control data sub-system. The first communications module and the second communications module may be wireless communications modules. The first communications module and the second communications module may be wired communications modules. The first instructions may be stored on the first non-transitory processor-readable storage medium and the second instructions may be stored on the second non-transitory processor-readable storage medium. The third instructions may be stored on a third non-transitory processor-readable storage medium. The third instructions may be stored on the second non-transitory processor-readable storage medium.

According to another broad aspect, the present disclosure describes a method of processing projection data by a system including at least one processor communicatively coupled to at least one non-transitory processor-readable storage medium, the method comprising: for a first area of an image to be projected: for a first portion of the first area: providing, by the at least one processor, a first set of at least two data sections, the at least two data sections in the first set representing different sub-areas of the first portion of the first area; storing, by the non-transitory processor-readable storage medium, the first set of at least two data sections as a first portion of the projection data; for a second portion of the first row: providing, by the at least one processor, a second set of at least one data section, the at least one data section of the second set representing the second portion of the first area; and storing, by the non-transitory processor-readable storage medium, the second set of at least one data section as a second portion of the projection data; and for a third portion of the first area: providing, by the at least one processor, a third set of at least two data sections, the at least two data sections of the third set representing different sub-areas of the third portion of the first area; and storing, by the non-transitory processor-readable storage medium, the third set of at least two data sections as a third portion of the projection data.

The system may include a projector, and the method may further comprise controlling, by the at least one processor, the projector to project an image based on the projection data. The system may include a communications module, the method may further comprise transmitting, by the communications module, the projection data.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide systems, devices, and methods for driving projectors and are particularly well-suited for use in scanning laser projectors.

The various discussions throughout this description make reference to concepts of a "desired image" and a "desired row area". For clarity, the meaning of these terms and similar terms are discussed with reference to FIGS. 1A and 1B.

Figure 1A:
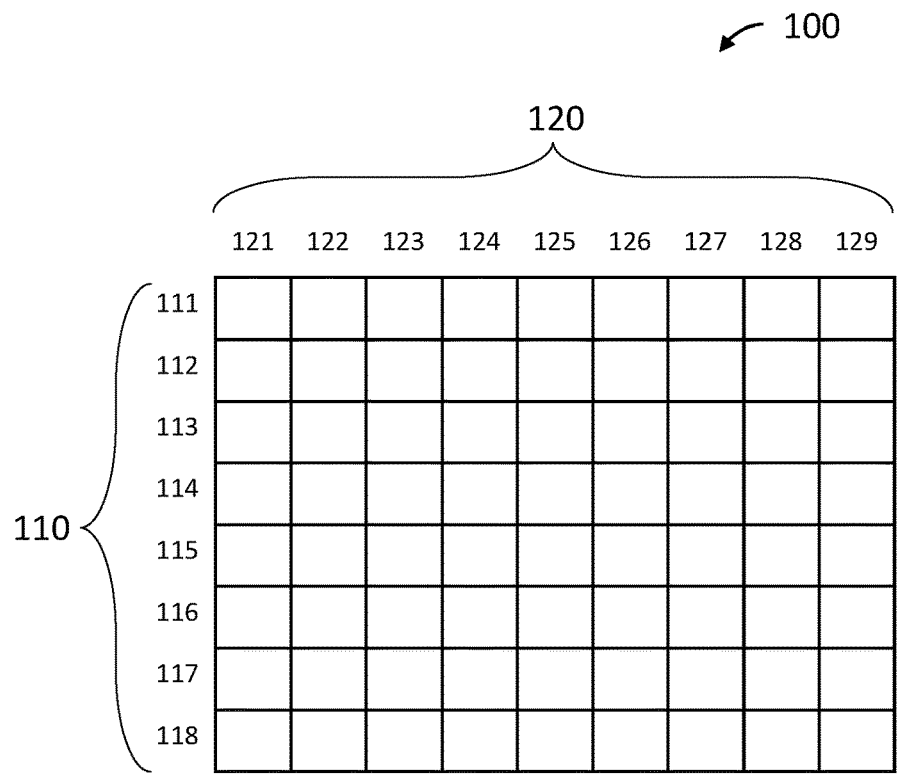
FIGS. 1A and 1B are exemplary representations of a desired image to be displayed.

FIG. 1A is a representation of an exemplary rasterized image 100 having a plurality of pixel rows 110 and a plurality of pixel columns 120. In FIG. 1A, each of the pixel rows 110 is oriented horizontally, and each of the pixel columns 120 is oriented vertically. However, "rows" and "columns" as referred to throughout this entire description can be oriented in any appropriate orientation. For example, "rows" could be oriented vertically, and "columns" could be oriented horizontally. As another example, "rows" and "columns" could be oriented neither completely horizontally nor completely vertically, but instead could be oriented at oblique angles relative to horizontal and vertical. Further, "rows" and "columns" do not have to be perfectly straight lines, but can include some curvature.

In FIG. 1A, image 100 includes eight pixel rows 111, 112, 113, 114, 115, 116, 117, and 118, and nine pixel columns 121, 122, 123, 124, 125, 126, 127, 128, and 129. However, the images discussed herein could include any appropriate number of rows and/or columns. Further, the number of rows in a given image may or may not be equal to the number of columns in the given image. As an example, a given image could contain 1920 columns and 1080 rows (commonly expressed as 1920 by 1080, or 1080p). Other non-limiting examples could include 1280 by 720 (720p), 2048 by 1080 (2K), 2560 by 1440 (1440p), 3840 by 2160 (4K), and 7680 by 4320 (8K). Throughout this disclosure, the term "desired image" is used to refer to an image which, when displayed by a display source, such as a projector, accurately represents a corresponding image raster. With reference to example image 100 in FIG. 1A, a "desired image" would be an image which, when displayed, accurately represents each pixel in rows 110 and columns 120, with minimal inaccuracies in the displayed area of each pixel. That is, when displaying an image based on an image raster input to a display, the displayed image can be considered as closely representing a "desired image" when the location of each displayed pixel accurately represents the location of each corresponding pixel in the image raster which is input to the display.

Figure 1B:
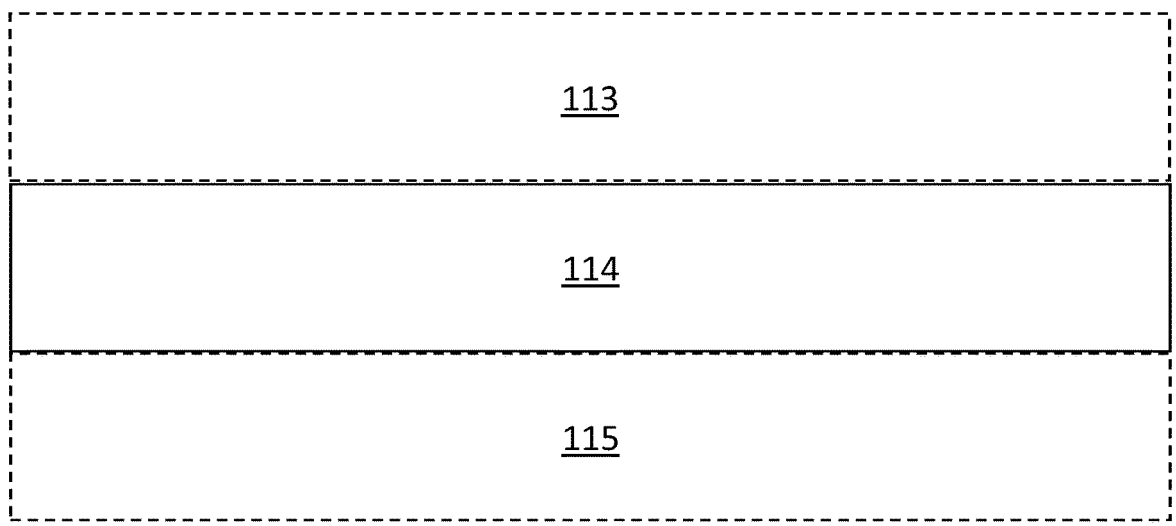

FIG. 1B is a zoomed-in view of image 100 to focus on three exemplary rows 113, 114, and 115. FIG. 1B does not illustrate the columns of image 100 to avoid obscuring the discussed features of FIG. 1B, but each of row 113, 114, and 115 can include any appropriate number of columns. FIG. 1B shows each of row 113, 114, and 115 having a given area. In the context of the present disclosure, a "desired row area" refers to an area of a row which, when displayed by a display, accurately represents the area of a corresponding row of an image raster input to the display. In the example of FIG. 1B, the "desired row area" of row 114 is shown by a rectangle with solid black outline, as an example.

Due to the operation of scanning laser projectors, a displayed image may not accurately represent a desired image, as discussed below.

As detailed above, a scanning laser projector can include a laser light source and at least one controllable mirror which is used to spatially distribute the laser light over a two-dimensional display area. In many cases the at least one controllable mirror can include two controllable mirrors: a "fast-axis mirror" and a "slow-axis mirror". The fast-axis mirror oscillates back and forth in a first dimension at a high frequency (e.g. 15 kHz, 21 kHz, or 42 kHz, as non-limiting examples), and the slow-axis mirror scans in a second dimension (typically orthogonal to the first dimension) at a lower frequency (e.g. the frame rate of the display, often 25-60 Hz). The slow-axis mirror can be driven to oscillate back and forth along the second dimension, or can be driven to move according to two phases: a "scan" phase in which the slow-axis mirror slowly scans along the second dimension to direct light from the light source to the display area, and a "retrace" phase in which the slow-axis mirror quickly returns to its starting position for the next scan phase. In either case, the slow axis mirror can be driven to continuously move, as opposed to suddenly moving in steps at the end of each pixel row.

Figure 2A:
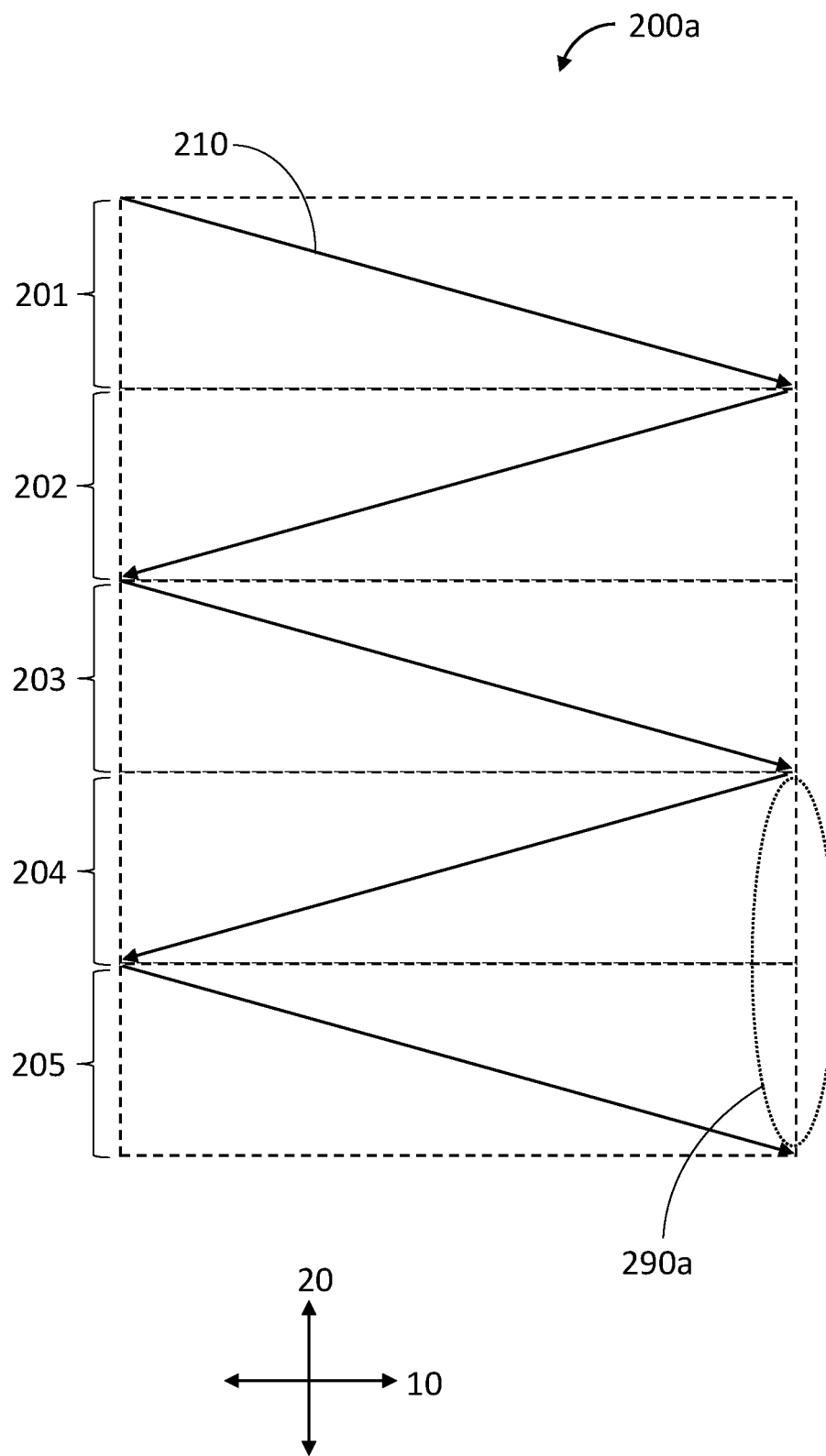
FIGS. 2A-2C illustrate projection patterns of a scanning laser projector.
Figure 2B:
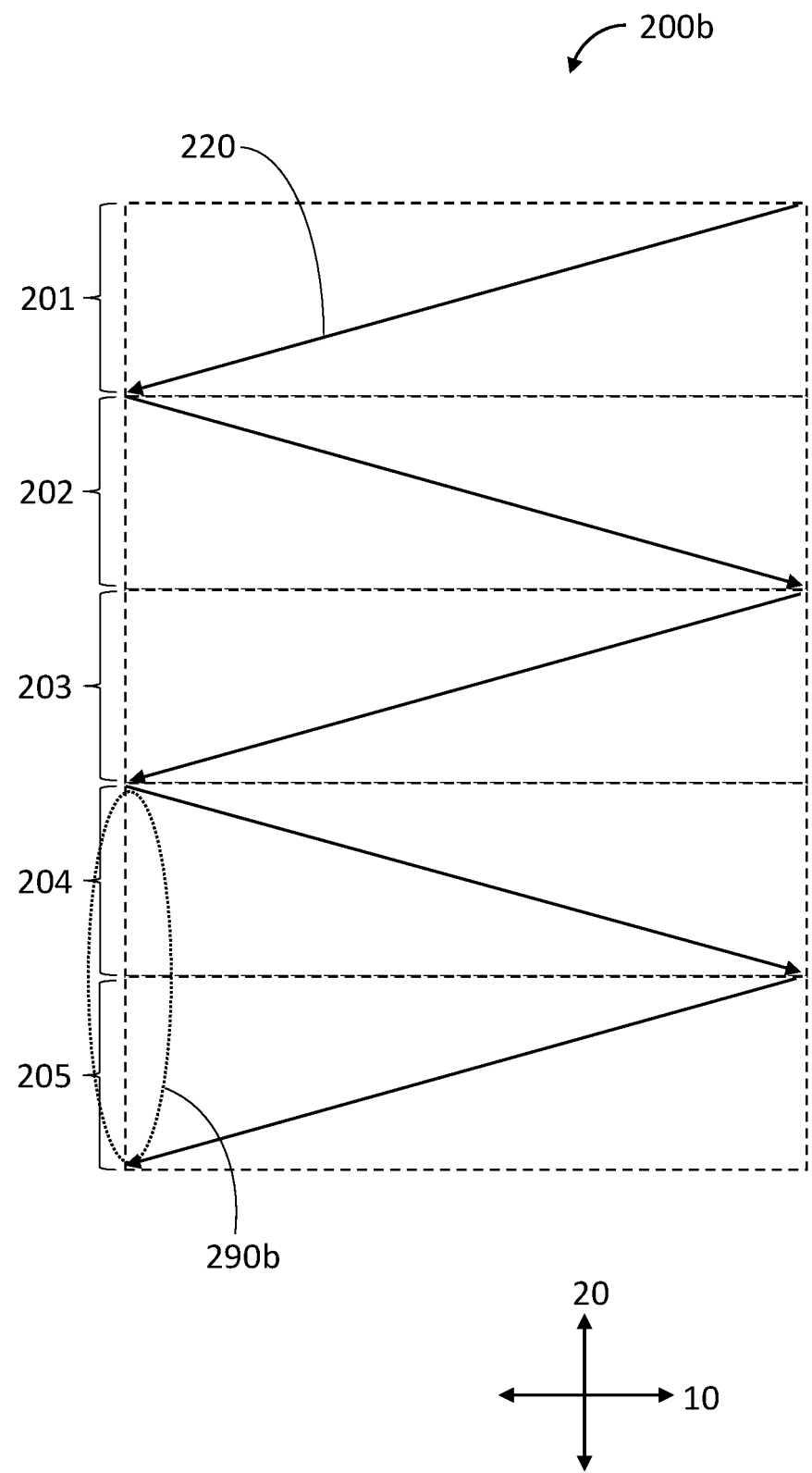
Figure 2C:
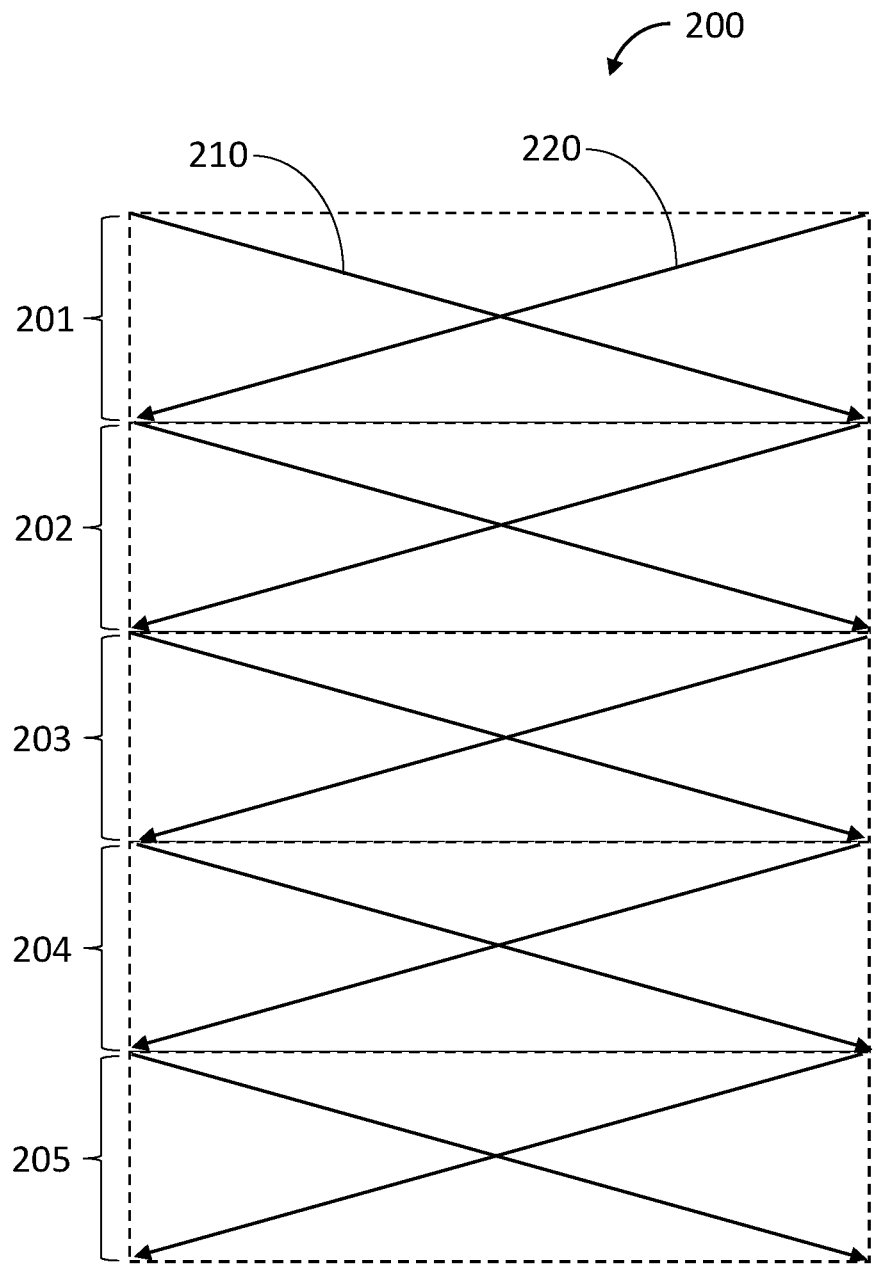
Figure 2C:
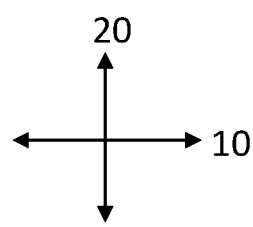

FIGS. 2A to 2C illustrate operation of such a system having a fast axis mirror and a slow axis mirror.

FIG. 2A shows an image raster 200 to be input to a scanning laser projector for projection, image raster 200 having a plurality of rows 201, 202, 203, 204, and 205. Each row is 1 pixel high, and can contain a plurality of pixels across. Although image raster 200 is only illustrated as having five rows, images to be displayed can have significantly more rows as detailed above. As one example, image raster 200 could include 1080 rows with 1920 pixels across each row. Image raster 200, and any other images discussed herein, can include any number of rows and/or any number of pixels in each row as is appropriate for a given application. Further, "rows" do not need to be horizontal as detailed above. FIG. 2A also shows a fast axis 10 which corresponds to the first dimension in which a fast-axis mirror of the projector oscillates, and FIG. 2A shows a slow axis 20 which corresponds to the second dimension in which the slow-axis mirror of the projector scans. Projection pattern 210 illustrates a path along which light from the projector light source will be projected. Due to the back and forth oscillation of the fast-axis mirror along fast axis 10 at a high frequency compared to the continuous scanning of the slow-axis mirror along slow axis 20, projection pattern 210 has a zig-zag shape. Consequently, for each row of pixels projected, the pixels corresponding to a given row of the input image raster will not be projected in a straight line parallel to the fast axis, but will rather be projected at a slight angle relative to the fast axis. That is, the actual projected position of pixels corresponding to a given row in the image input raster may not match a desired row area. This projection pattern can create gaps at the edges of the projected image, such as gap 290a illustrated in FIG. 2A.

FIGS. 2B and 2C illustrate a technique for addressing the above issue.

FIG. 2B illustrates image raster 200 to be projected according to an alternative projection pattern 220. Projection pattern 220 essentially mirrors projection pattern 210 along the fast axis 10, such that each row is scanned in the opposite direction compared to projection pattern 210. As a result, the gaps at the edges of the projected image in FIG. 2B will be on an opposite side of the display area compared to gaps at the edge of the projected image in FIG. 2A. For example, gap 290a can be seen on the right side of the projected image in FIG. 2A, whereas gap 290b can be seen on the left side of the projected image in FIG. 2B.

The appearance of gaps at the edges of the projected images in FIGS. 2A and 2B can be reduced by alternating between projection pattern 210 and 220 each frame. For example, a first frame could be projected according to projection pattern 210, a second frame could be projected according to projection pattern 220, a third frame could be projected according to projection pattern 210, a fourth frame could be projected according to projection pattern 220, and so on. This is illustrated in FIG. 2C, which shows projection pattern 210 and projection pattern 220 overlapping for projection of image raster 200. As can be seen in FIG. 2C, gaps at the edges of the projected image are significantly smaller than gaps at the edges of the projected images in FIGS. 2A and 2B.

Figure 3:
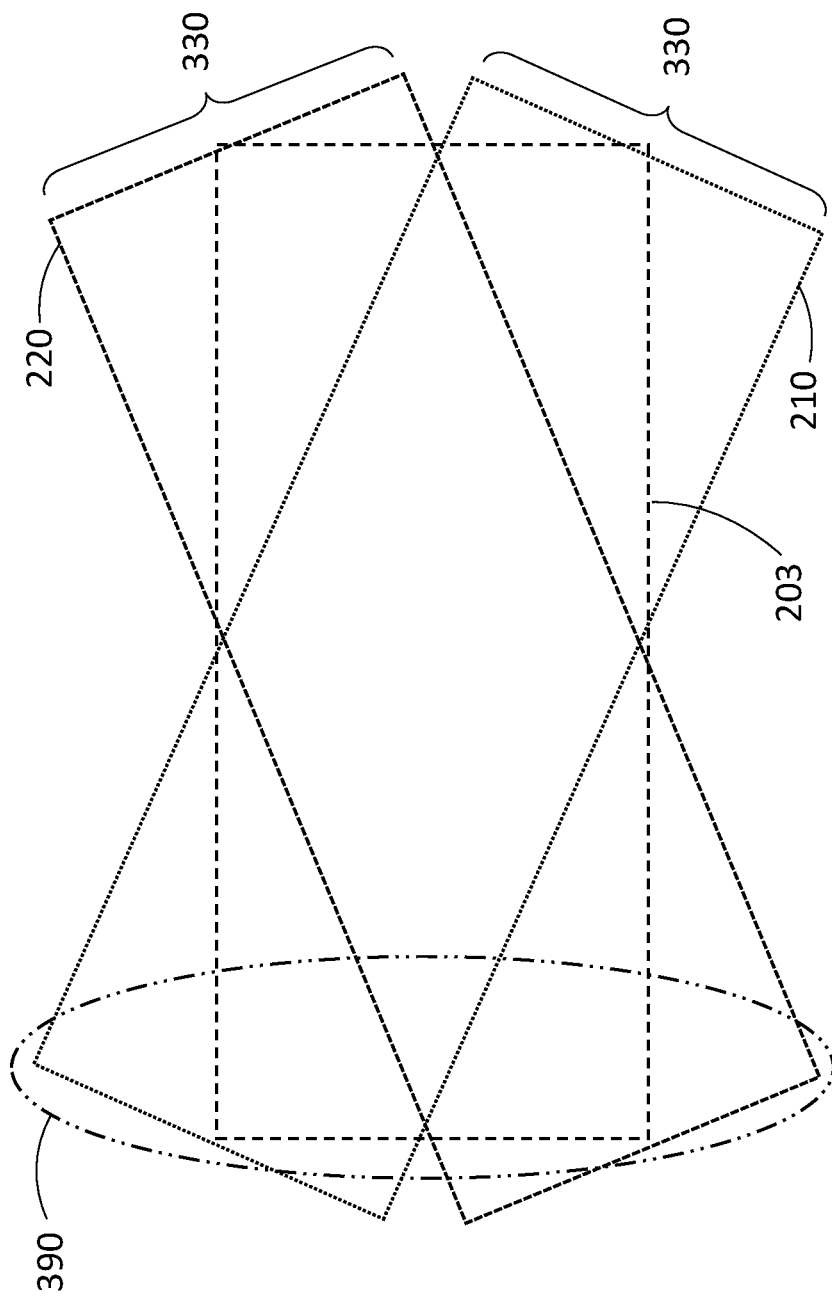
FIG. 3 illustrates projection of an image row according to the projection patterns of FIGS. 2A-2C

However, the above discussed techniques can cause overlapping and/or blurry pixels to be displayed at the edges of an image, as detailed with regards to FIG. 3. FIG. 3 illustrates a single row 203 of an image raster to be projected according to both projection pattern 210 and projection pattern 220. The desired row area of row 203 is illustrated by a dashed box. Although a single row is shown in FIG. 3 and discussed below, the discussion regarding FIG. 3 applies to each of the rows being projected.

The light being projected by a scanning laser projector has a spot size 330. As a result, since the beam is scanned at a slight angle compared to the fast axis 10 as detailed above, the projected beam will extend outside of the desired row area at the edges of the image being projected. This is true for both projection pattern 210 and projection pattern 220. Further, light projected according to projection pattern 210 will extend beyond one side of the desired row area at one edge of the row, whereas light projected according to projection pattern 220 will extend beyond an opposite side of the desired row area at the same given edge of the row compared to projection pattern 210. For example, as can be seen in FIG. 3, at the left edge of row 203, light projected according to projection pattern 210 extends beyond a top of the desired row area, whereas light projected according to projection pattern 220 extends beyond a bottom of the desired row area. The result is that the image data for the left side of the image will be projected over a much larger area 390 than the desired area of the row. A similar discussion applies to the right side of row 203. Consequently, the edges of the projected image will overlap adjacent rows, causing blurring at the edges of the projected image.

The above issue can be addressed by projecting different data at the edges of the image, depending on what projection pattern the image is projected according to, as discussed below.

Figure 4:
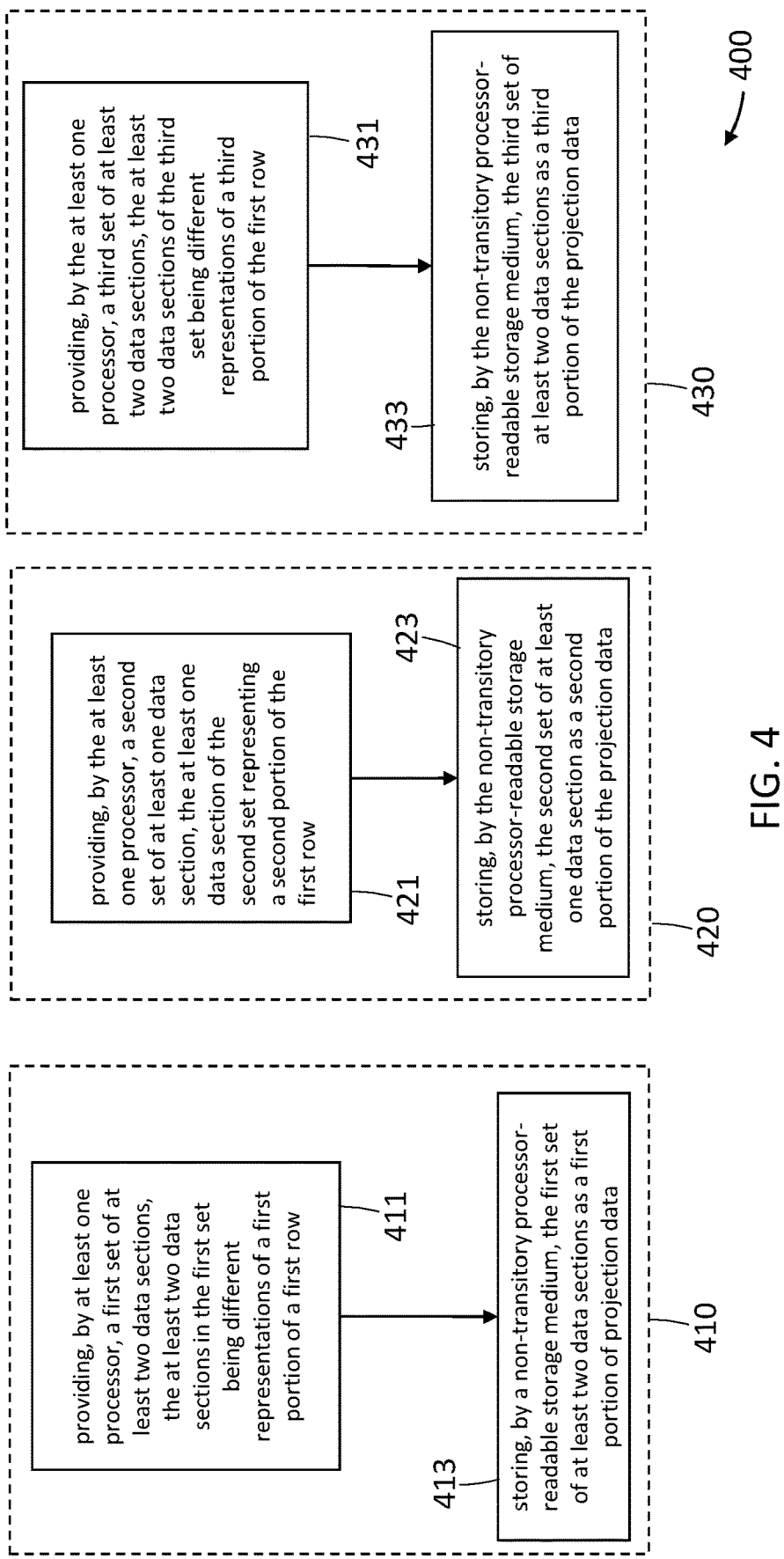
FIG. 4 is a flowchart which illustrates an exemplary method for providing and storing projection data according to at least one exemplary implementation of the present systems, devices, and methods.

FIG. 4 is a flowchart which illustrates an exemplary method 400 for providing and storing projection data which includes different sets of data sections for different portions of an image to be projected. Method 400 includes at least acts 411 and 413 performed with reference to a first portion of an image raster representing an image to be projected as delineated by box 410; acts 421 and 423 performed with reference to a second portion of the image raster representing the image to be projected as delineated by box 420; and acts 431 and 433 performed with reference to a third portion of the image raster representing an image to be projected as delineated by box 430. The acts delineated by box 410, box 420, and box 430 could be performed in any order as appropriate for a given application.

The details of the acts of method 400 will be discussed below, also with reference to FIGS. 5A and 5B. To clarify the discussion of the acts of method 400, FIG. 5A illustrates an exemplary desired image 500A, and FIG. 5B illustrates exemplary projection data 500B which can be obtained as a result of method 400 in FIG. 4.

Figure 5A:
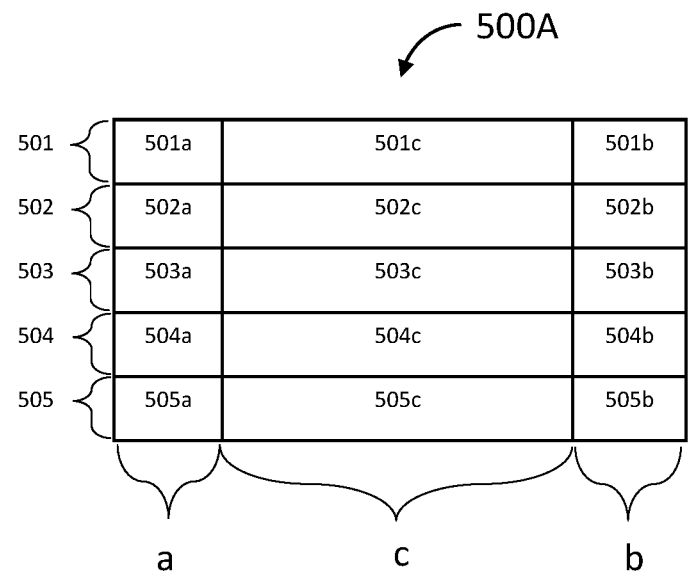
FIG. 5A is an exemplary representation of a desired image to be displayed.
Figure 5B:
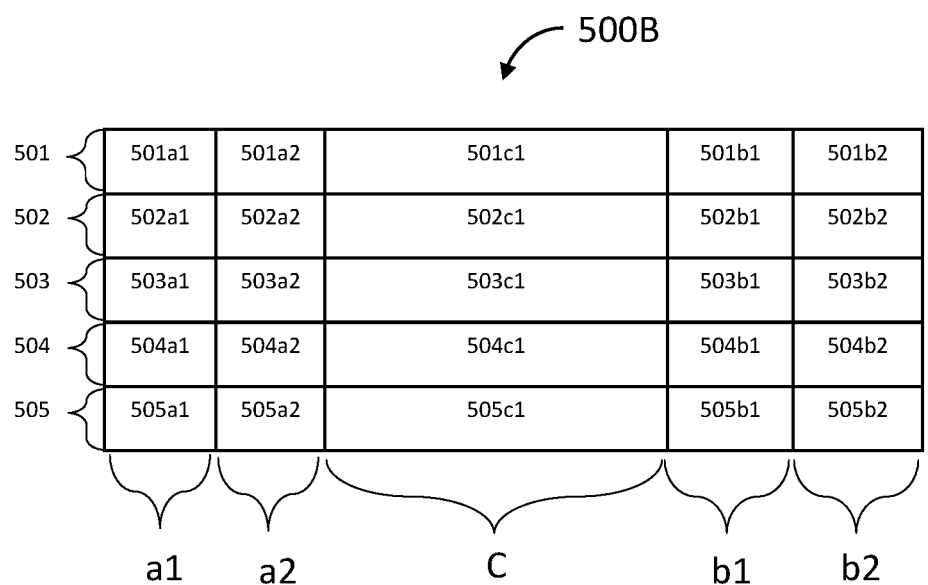
FIG. 5B illustrates projection data which can be provided for projecting the image of FIG. 5A in accordance with at least one exemplary implementation of the present systems, devices, and methods.

FIG. 5A shows image 500A having a plurality of rows 501, 502, 503, 504, and 505. Each row can be 1 pixel high, and can contain a plurality of pixels across. Although image 500A is only illustrated as having five rows, this is for illustrative purposes, and images displayed by a scanning laser projector can have significantly more rows. Further, each row of image 500A has a first portion "a", a second portion "c", and a third portion "b". In the case of FIG. 5A, the division between first portion "a", second portion "c", and third portion "b" is conceptual, and can be determined or dictated as appropriate for a given application. In general, the size of first portion "a" and third portion "b" can be determined according to the size of areas at the edges of image 500A for which, when projected by a scanning laser projector, the projected image extends significantly, perceptibly, and/or unacceptably beyond a desired row area for a given row. This determination of portion size can be performed during design, testing, and/or calibration of a given scanning laser projector architecture, and/or can be configurable with software or firmware. As one example, for an image having 1080 pixels across in each row, first portion "a" could be chosen to be 100 pixels, second portion "c" could be chosen to be 880 pixels, and third portion "b" could be chosen to be 100 pixels. Additionally, although the portions of image 500A are first portion "a" on the left and third portion "b" on the right, these portions are not limited to a left and right orientation. For example, first portion "a" and third portion "b" could be reversed with respect to second portion "c". As further examples, first portion "a", second portion "c", third portion "b" could be oriented in a top-to-bottom sequence or a bottom-to-top sequence. As another example, the portions could be arranged at an oblique angle relative to a horizontal axis running from left to right or a vertical axis running from top to bottom.

One objective of method 400 in FIG. 4 is to produce projection data which can be used to drive a projector, where the produced projection data has sets of different data sections which are different or alternative representations of portions of the image to be projected. In this regard, FIG. 5B illustrates exemplary projection data 500B, which can be obtained as a result of applying method 400 with respect to desired image 500A shown in FIG. 5A.

Projection data 500B represents a plurality of rows 501, 502, 503, 504, and 505 of desired image 500A. For each row represented by the projection data 500B, the projection data 500B includes a first set of at least two data sections "a1" and "a2", a second set of at least one data section "c1", and a third set of at least two data sections "b1" and "b2". For each row represented by the projection data, each of the at least two data sections "a1" and "a2" in the first set are different representations of first portion "a" in desired image 500A. For each row represented by the projection data, the at least one data section "c1" in the second set represents second portion "c" in desired image 500A. For each row represented by the projection data, each of the at least two data sections "b1" and "b2" in the third set are different representations of third portion "b" in desired image 500A. As an example, for row 503 of desired image 500A, projection data 500B includes a first set of at least two data sections 503a1 and 503a2, a second set of at least one data section 503c1, and a third set of at least two data sections 503b1 and 503b2. Each of the at least two data sections 503a1 and 503a2 in the first set are different representations of first portion 503a in desired image 500A. Each of the at least one data section 503c1 in the second set represents second portion 503c in desired image 500A. Each of the at least two data sections 503b1 and 503b2 in the third set are different representations of third portion 503b in desired image 500A.

In the context of the present systems, devices, and methods, a set of at least one data section can be limited to including a single data section, but can also include more than one data section.

In FIG. 5B, projection data 500B is illustrated such that each row of desired image 500A is represented by a corresponding "row" of projection data 500B. However, the projection data 500B is not necessarily physically arranged in a rectangular shape defined by rows and columns. As an example, projection data 500B could be a stream of data, with optional row separation flags therein to indicate which regions of the projection data represent which rows of desired image 500A. Further, each "row" of the projection data illustrated in FIG. 5B shows data sections "a1" and "a2" being adjacent each other spatially in the row, and shows data sections "b1" and "b2" as being adjacent each other spatially in the row. However, once projected, this may not be the spatial relationship between each data section in the projected image, as discussed later with reference to at least FIGS. 7D, 7E, 8D, 8E, and 9. For example, by selectively projecting one of the first data section "a1" and the second data section "a2" of the first set, and selectively projecting one of the first data section "b1" and the second data section "b2" of the third set, an image projected according to projection data 500B can more closely represent desired image 500A.

Returning to method 400 in FIG. 4, box 410 delineates acts which are performed with reference to first portion "a" of desired image 500A, which includes at least acts 411 and 413. For a first portion "a" of a first row of desired image 500A, at least one processor can in act 411 provide a first set of at least two data sections "a1" and "a2", the at least two data sections in the first set being different representations of the first portion "a" of the first row. "Providing" as used herein can include retrieving existing image data from a source image, generating the data section by interpolating between received image data, or rendering new image data, for example. At 413, a non-transitory processor-readable storage medium can store the first set of at least two data sections "a1" and "a2" as a first portion of the projection data.

Figure 10A:
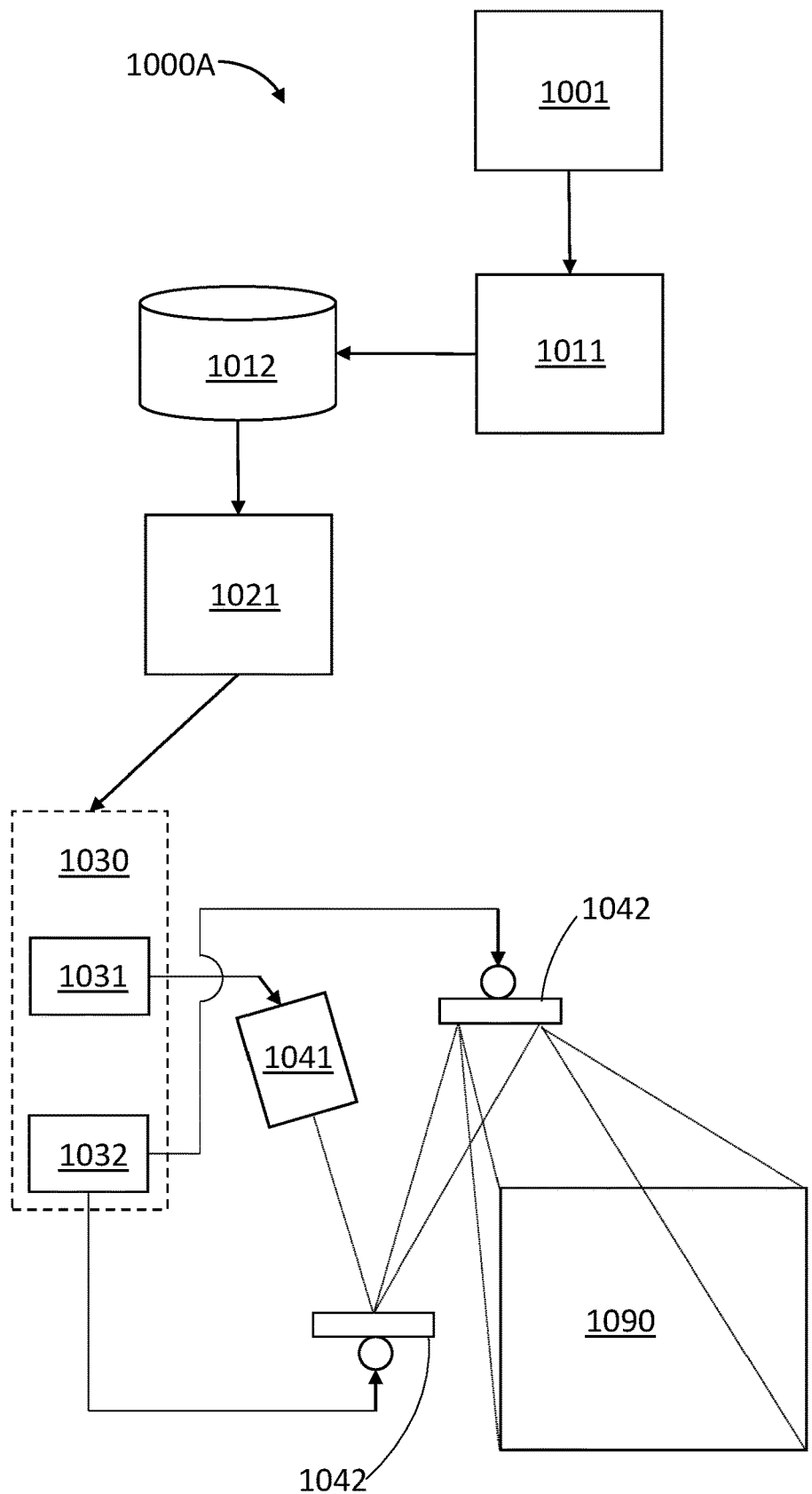
FIGS. 10A, 10B, and 10C are schematic views which illustrate exemplary systems for implementing the methods discussed herein.
Figure 10B:
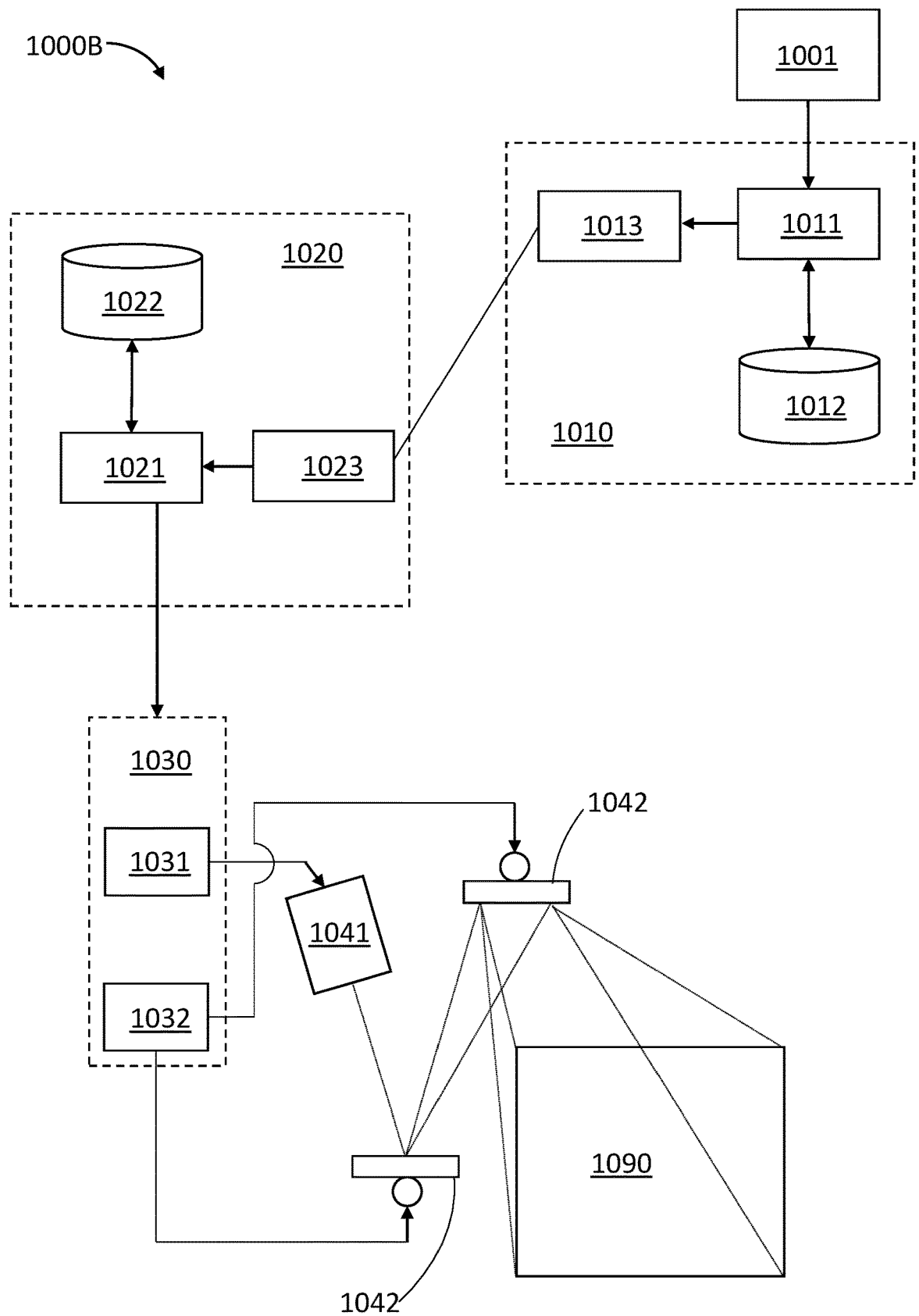
Figure 10C:
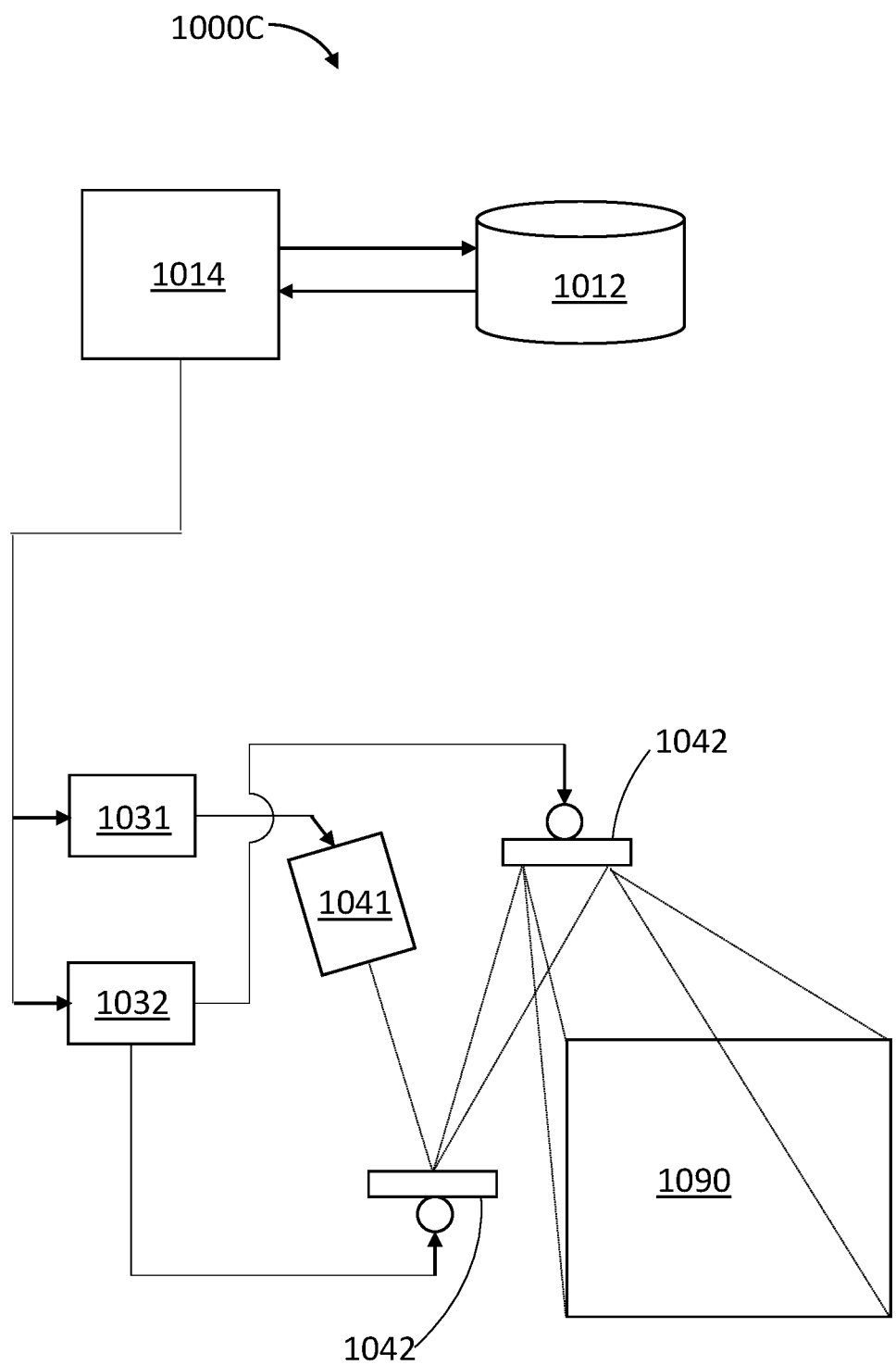

For exemplary hardware arrangements which can perform the acts of method 400, please see FIGS. 10A, 10B, and 10C and the corresponding description.

Box 420 delineates acts which are performed with reference to second portion "c" of desired image 500A, which includes at least acts 421 and 423. For a second portion "c" of the first row of desired image 500A, the at least one processor can in act 421 provide a second set of at least one data section "c1", the at least one data section of the second set representing the second portion "c" of the first row. At 423, the non-transitory processor-readable storage medium can store the second set of at least one data section "c1" as a second portion of the projection data.

Box 430 delineates acts which are performed with reference to third portion "b" of desired image 500A, which includes at least acts 431 and 433. For a third portion "b" of the first row desired image 500A, the at least one processor can in act 431 provide a third set of at least two data sections "b1" and "b2", the at least two data sections of the third set being different representations of the third portion "b" of the first row. At 433, the non-transitory processor-readable storage medium can store the third set of at least two data sections as a third portion of the projection data.

Each of the acts in box 410, box 420, and box 430 can be repeated for each row in an image raster, to provide projection data representing the entire image raster. Further, though the above discussion makes reference to a "first row", this can refer to any given row in the desired image 500A, and is not limited to being a row at the edge of the desired image 500A.

Exemplary implementations of method 400 are discussed below with reference to FIGS. 6A-6F.

Figure 6A:
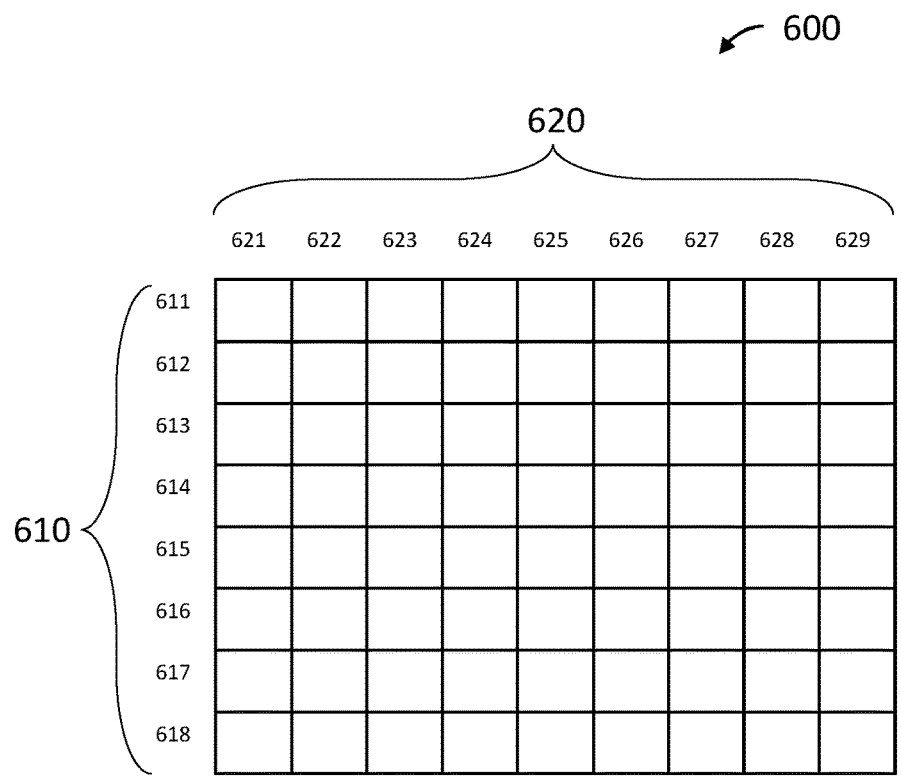
FIGS. 6A-6F illustrate exemplary systems, devices, and methods for providing projection data such as the projection data in FIG. 5B.

FIGS. 6A-6D illustrate exemplary implementations in which the at least one processor receives image data from an image source. The image data can be an image raster, having a plurality of pixel rows and pixel columns. FIG. 6A illustrates exemplary image raster 600 in this regard. Image raster 600 includes a plurality of rows 610 and a plurality of columns 620. The plurality of rows 610 is shown as including eight rows 611, 612, 613, 614, 615, 616, 617, and 618, and the plurality of columns 620 is shown as including nine columns 621, 622, 623, 624, 625, 626, 627, 628, and 629. However, similarly to as discussed above with regards to FIG. 1A, image data 600 could include any number of rows and any number of columns as appropriate for a given application, and the number of rows may or may not be equal the number of columns. Further similarly to as discussed above with regards to FIG. 1A, rows need not be horizontal, and columns need not be vertical.

Figure 6B:
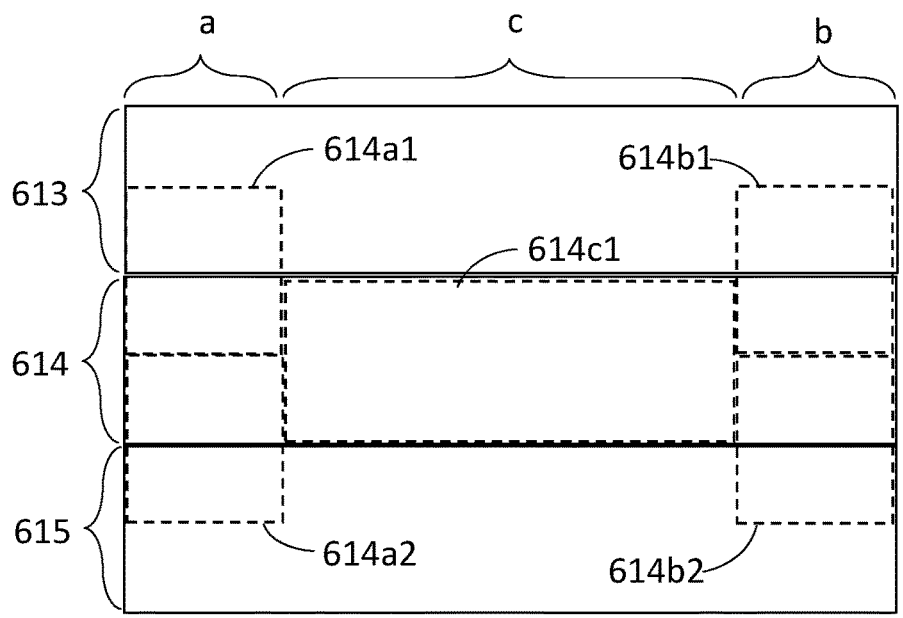

In the context of method 400 illustrated in FIG. 4, each of the acts of providing sets of at least one data section (acts 411, 421, and 431) can comprise generating the data sections based on the image raster 600 received by the at least one processor. In this regard, FIG. 6B is a zoomed in view of image raster 600 to focus on three rows 613, 614, and 615. Each row 613, 614, and 615 includes a plurality of columns, but to avoid obscuring the discussed elements of FIG. 6B, delineations between individual columns are not drawn in FIG. 6B. However, FIG. 6B does delineate a first portion "a", a second portion "c", and a third portion "b" for each of rows 613, 614, and 615. For each of rows 613, 614, and 615, each of first portion "a", second portion "c", and third portion "b" can encompass a plurality of columns. For row 614, FIG. 6B also illustrates: a first set of at least two data sections including a first data section 614a1 and a second data section 614a2; a second set of at least one data section including a data section 614c1; and a third set of at least two data sections including a first data section 614b1 and a second data section 614b2. Each of these sets of data sections can be obtained from image raster 600 and are included in projection data which can be used to drive a projector. In the context of FIGS. 6B-6F, each of the obtained data sections is illustrated spatially over representative rows of image raster 600, to show the spatial area represented by each data section. How each of these data sections can be obtained from image raster 600 is discussed below.

To generate each set of data sections, the at least one processor can interpolate between the row of interest and a preceding row or a succeeding row. For example, to generate the first data section 614a1 of the first set, the at least one processor can interpolate between pixels in first portion "a" of row 614 and pixels in first portion "a" of row 613 which precedes row 614. As a result, the first data section 614a1 of the first set will represent a part of the image in first portion "a" which lies between row 613 and row 614. As another example, to generate the second data section 614a2 of the first set, the at least one processor can interpolate between pixels in first portion "a" of row 614 and pixels in first portion "a" of row 615 which succeeds row 614. As a result, the second data section 614a2 of the first set will represent a part of the image in first portion "a" which lies between row 614 and row 615. As another example, to generate the first data section 614b1 of the third set, the at least one processor can interpolate between pixels in third portion "b" of row 614 and pixels in third portion "b" of row 613 which precedes row 614. As a result, the first data section 614b1 of the third set will represent a part of the image in third portion "b" which lies between row 613 and 614. As another example, to generate the second data section 614b2 of the third set, the at least one processor can interpolate between pixels in third portion "b" of row 614 and pixels in third portion "b" of row 615 which succeeds row 614. As a result, the second data section 614b2 of the third set will represent a part of the image in third portion "b" which lies between row 614 and 615.

To provide the second set of at least one data section for a given row, the at least one processor can read image data from the second section "c" of the corresponding row in the input image raster. For example, data section 614c1 of the second set can be provided by reading data from the second section "c" of row 614 in image raster 600. However, it is possible that the second set can include more than one data section, and each of such data sections could be obtained using interpolation as discussed above.

The interpolation discussed above can be performed a number of ways. Firstly, the at least one processor can interpolate between each pixel in the row for which a set of data sections is to be determined and each corresponding pixel in the preceding or succeeding row. Stated differently, the at least one processor can interpolate between pixels within the same column.

In terms of what is interpolated, if the image data is stored as color component values (such as a Red value, a Green value, and a Blue value for each pixel), interpolation between two pixels could comprise a plurality of separate interpolations, one interpolation for each color component. For example, interpolation between a first pixel and a second pixel could comprise a first interpolation between a red value of the first pixel and a red value of the second pixel, a second interpolation between a green value of the first pixel and a green value of the second pixel, and a third interpolation between a blue value of the first pixel and a blue value of the second pixel. For image data organized according to other schemes, such as separate Hue, Saturation, and Brightness channels, each interpolation between two pixels could comprise a separate interpolation between each different channel.

Further, interpolation between two pixels can be evenly weighted or unevenly weighted. In the case of even weighting, interpolation between two different pixels can comprise determining an average between each corresponding component of the pixels, or determining a median between each corresponding component of the pixels. Such an even weighting scheme would result in data sections which represent a portion of an image to be displayed which evenly falls in the middle of the rows being interpolated. In the case of uneven weighting, interpolation between two different pixels can comprise assigning a weighting factor to the interpolation, such that the interpolation weights pixel information of one of the pixels more heavily than the other, and thus skews towards one pixel or the other. Such an uneven weighting scheme would result in alternative data sections which are closer to one row than another.

Figure 6C:
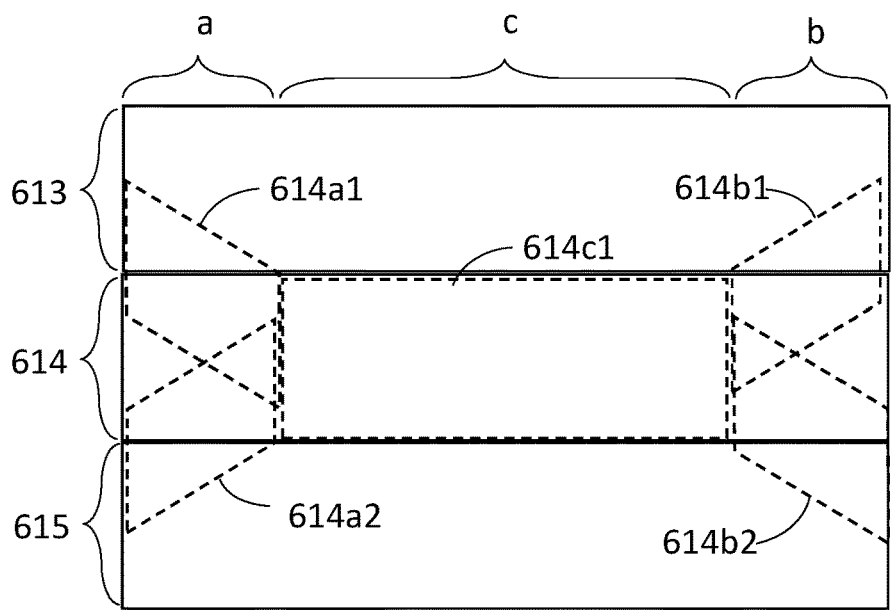

Further still, interpolation between rows can be applied with a consistent weighting across an entire portion for which interpolation is being performed, or the weighting can change over the portion for which interpolation is being performed. FIG. 6C illustrates exemplary interpolations in which the weighting of interpolations can be different for different image areas. For example, for first portion "a", first data section 614a1 of the first set is generated by interpolating between pixels of row 614 and pixels of row 613. For pixels near the second portion "c" of the image, the interpolation can weight row 614 more heavily than row 613, such that the resulting interpolated pixels represent an area of the desired image which is closer to row 614 than row 613. On the other hand, for pixels near the edge of the image, the interpolation can weight row 614 and row 613 more equally, such that the resulting interpolated pixels represent and area of the desired image which is evenly between row 613 and row 614. The relative weighting for each column on which interpolation is performed can be determined on a per-column basis, such that there is a gradient of weighting factors from the edge of the image to the second portion "c". This will result in the interpolation producing a first data section 614a1 of the first set which represents a portion of the desired image which slants towards row 614 based on proximity to the center of the image. Preferably, this slant can be similar to the slanted projection pattern of the projector, to produce a more accurate representation of a desired image. The above discussion can also be applied to second data section 614a2 of the first set, first data section 614b1 of the third set, and second data section 614b2 of the third set, as shown in FIG. 6C.

In some implementations, in the context of method 400 illustrated in FIG. 4, each of the acts of providing sets of data sections (acts 411, 421, and 431) can comprise reading data for each data section directly from the image raster 600 received by the at least one processor. In particular, such a technique could be utilized in cases where projection data based on a source image raster may be of lower resolution than the source image raster. For example, image raster 600 could comprise 2160 rows and 4096 columns, whereas projection data based on the image raster 600 may only represent the data from 1080 rows and 2048 columns. That is, when providing projection data based on image raster 600, only every second row of image raster 600 may be read and stored as projection data. In the present systems, devices, and methods, this higher resolution image raster can be useful for providing sets of data sections.

Figure 6D:
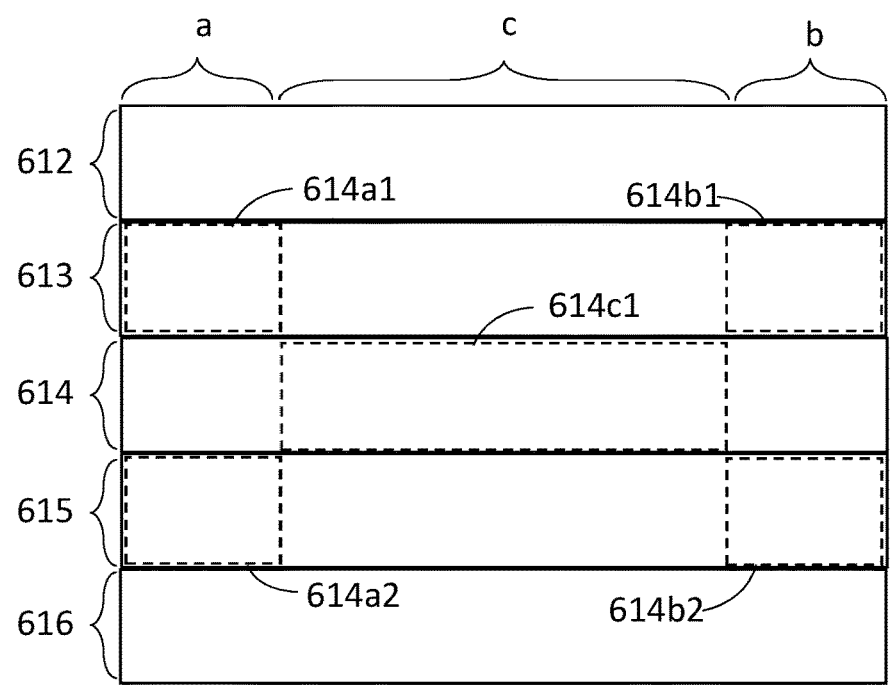

In this regard, FIG. 6D is a zoomed in view of image raster 600 to focus on five rows 612, 613, 614, 615, and 616. Each row 612, 613, 614, 615, and 616 includes a plurality of columns, but to avoid obscuring the discussed elements of FIG. 6D, delineations between individual columns are not drawn in FIG. 6D. However, FIG. 6D does delineate a first portion "a", a second portion "c", and a third portion "b" for each of rows 612, 613, 614, 615, and 616. For each of rows 612, 613, 614, 615, and 616, each of first portion "a", second portion "c", and third portion "b" can encompass a plurality of columns. When providing projection data based on the rows of the image raster shown in FIG. 6D, as an example only every second row may be intended to be read and represented in the projection data. For example, of the rows shown in FIG. 6D, only rows 612, 614, and 616 may be read and represented as projection data. However, in the context of the present systems, devices, and methods, the data in the unused rows (row 613 and 615) may be useful for providing sets of data sections. For example, to provide each data section as in acts 411, 421, and 431 of method 400 in FIG. 4, the at least one processor can read data from an otherwise unused row of the image raster. For example, to provide the first data section 614a1 of the first set, the at least one processor can read data in first portion "a" of row 613. As a result, the first data section 614a1 of the first set will represent a part of the image in first portion "a" which lies between row 612 and row 614. As another example, to provide the second data section 614a2 of the first set, the at least one processor can read data in first portion "a" of row 615. As a result, the second data section 614a2 of the first set will represent a part of the image in first portion "a" which lies between row 614 and row 616. As another example, to generate the first data section 614b1 of the third set, the at least one processor can read data in third portion "b" of row 613. As a result, the first data section 614b1 of the third set will represent a part of the image in third portion "b" which lies between row 612 and 614. As another example, to generate the second data section 614b2 of the third set, the at least one processor can read data in third portion "b" of row 615. As a result, the second data section 614b2 in the third set will represent a part of the image in third portion "b" which lies between row 614 and 616.

To provide the second set of at least one data section for a given row, the at least one processor can read image data from the second section "c" of the corresponding row in the input image raster. For example, data section 614c1 of the second set can be provided by reading data from the second section "c" of row 614 in image raster 600. However, it is possible that the second set can include more than one data section, and each of such data sections could be obtained by reading unused rows similar to as discussed above.

In some implementations, in the context of method 400 illustrated in FIG. 4, each of the acts of providing sets of data sections (acts 411, 421, and 431) can comprise generating the sets of data sections directly as projector data. In particular, such a technique could be utilized in cases where the at least one processor generates projector data, instead of receiving an image raster from an image source. For example, the at least one processor could read sprite data and/or vector image data from at least one non-transitory processor-readable storage medium, and could render projection data by overlaying the sprite data and/or vector data. Such generation is particularly useful for rendering of user interfaces.

Figure 6E:
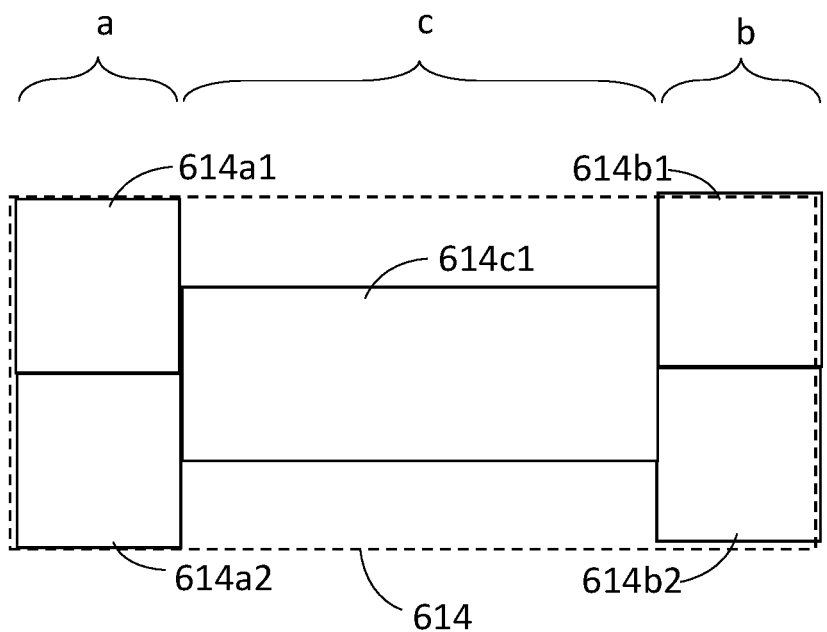

In this regard, FIG. 6E is a zoomed in view of a desired image to focus on a single area 614. Area 614 can roughly resemble a row of the desired image, but is not a "row of pixels", since in this case the desired image is not input as an image raster. FIG. 6E delineates a first portion "a", a second portion "c", and a third portion "b" for area 614. When generating projection data, instead of rendering a single row of pixels, the at least one processor can render, for the first portion "a" of the area 614, a first set of at least two data sections including a first data section 614a1 of the first set and a second data section 614a2 of the first set. Further, for the second portion "c" of the area 614, the at least one processor can render a second set of at least one data section including data section 614c1. Further, for the third portion "b" of the area 614, the at least one processor can render a third set of at least two data sections including at least a first data section 614b1 of the third set, and a second data section 614b2 of the third set. The first set of at least two data sections can be generated with each of the at least two data sections representing different sub-areas of the first portion "a" of the area, as shown in FIG. 6E. For example, first data section 614a1 of the first set can represent an upper sub-area of first portion "a", and second data section 614a2 of the first set can represent a lower sub-area of first portion "a". The third set of at least two data sections can be generated with each of the at least two data sections representing different sub-areas of the third portion "b" of the area, as shown in FIG. 6E. For example, first data section 614b1 of the third set can represent an upper sub-area of third portion "b", and second data section 614b2 of the third set can represent a lower sub-area of third portion "b". Further, to fill a desired projection area with display content, adjacent areas can overlap. For example, area 614 may overlap with similar adjacent areas of the desired image. In one implementation, the second set of at least one data section 614c1 can encompass only a sub-area of area 614 as shown in FIG. 6E. Adjacent areas in the image may overlap with area 614, to the extent that data section 614c1 is adjacent a corresponding data section in the overlapping area.

In the above exemplary implementations, sets of at least two data sections are provided for edge portions of an image in order to more accurately represent the edges of the desired image. This concept can be extended to generating sets of at least two data sections for the entire image, thus improving the image quality throughout the whole image. Such an implementation would be particularly effective for cases such as those illustrated in FIG. 6C, where the data sections can be slanted to align with the slant of a given projection pattern. However, providing sets of at least two data sections for larger portions of the image, such as the entire image, comes with tradeoffs. For example, the larger the portions for which sets of at least two data sections are provided, the larger the size of the projection data, and the more processing power required to generate and read the projection data. Further, in many cases the visual improvement from representing larger areas with sets of at least two data sections will be negligible. This can be seen in FIG. 3, where the closer a given pixel or portion is to the center of a row horizontally within the row, the closer to the center the given pixel or portion will be vertically within the row. That is, the closer a portion is to the center of the desired image horizontally, the more accurately the projected image will represent the desired image. Consequently, near the center of the rows horizontally, there may not be much visual inaccuracy to fix. In view of the above, it is preferable for the relative sizes of the first portion "a", the second portion "c", and the third portion "b" to strike a balance between improving visual quality of the displayed image while maintaining a relatively small projection data size.

Figure 6F:
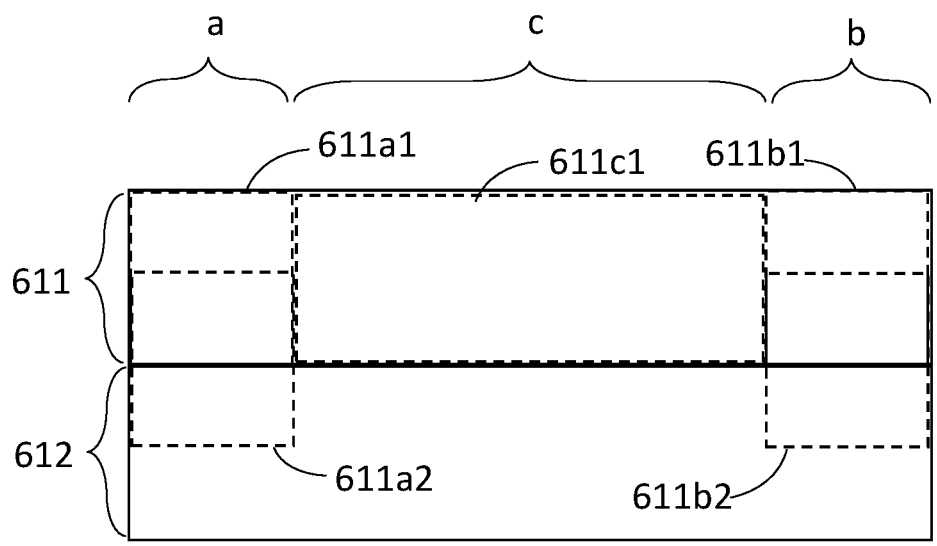

The examples discussed above describe techniques for providing sets of data sections for various rows which appear throughout an image. However, for the edge rows (e.g., top and/or bottom rows) in an image, there may be no preceding or succeeding image area based on which at least some of the data sections can be provided. To address this, for an edge row of an image, the providing of a data section based on image area which precedes the first row may instead involve (e.g., be replaced by) providing the data section based on only image data from within the area of the edge row. This concept is illustrated in FIG. 6F, which is a zoomed in view showing top row 611 and second-to-top row 612 of image raster 600. To provide the first data section 611a1 of the first set, the at least one processor can read data from first portion "a" of row 611. Similarly, to provide the first data section 611b1 of the third set, the at least one processor can read data from third portion "b" of row 611. However, the at least one processor can still provide the second data section 611a2 of the first set and the second data section 611b2 of the third set to represent area between row 611 and row 612 using any of the techniques described above with reference to FIGS. 6B-6E.

The above discussion also applies to other edges rows of an image (e.g. bottom), where the providing of data sections based on image area which succeeds the bottom row may instead involve (e.g., be replaced by) providing only image data from within the area of the bottom row.

Figure 7A:
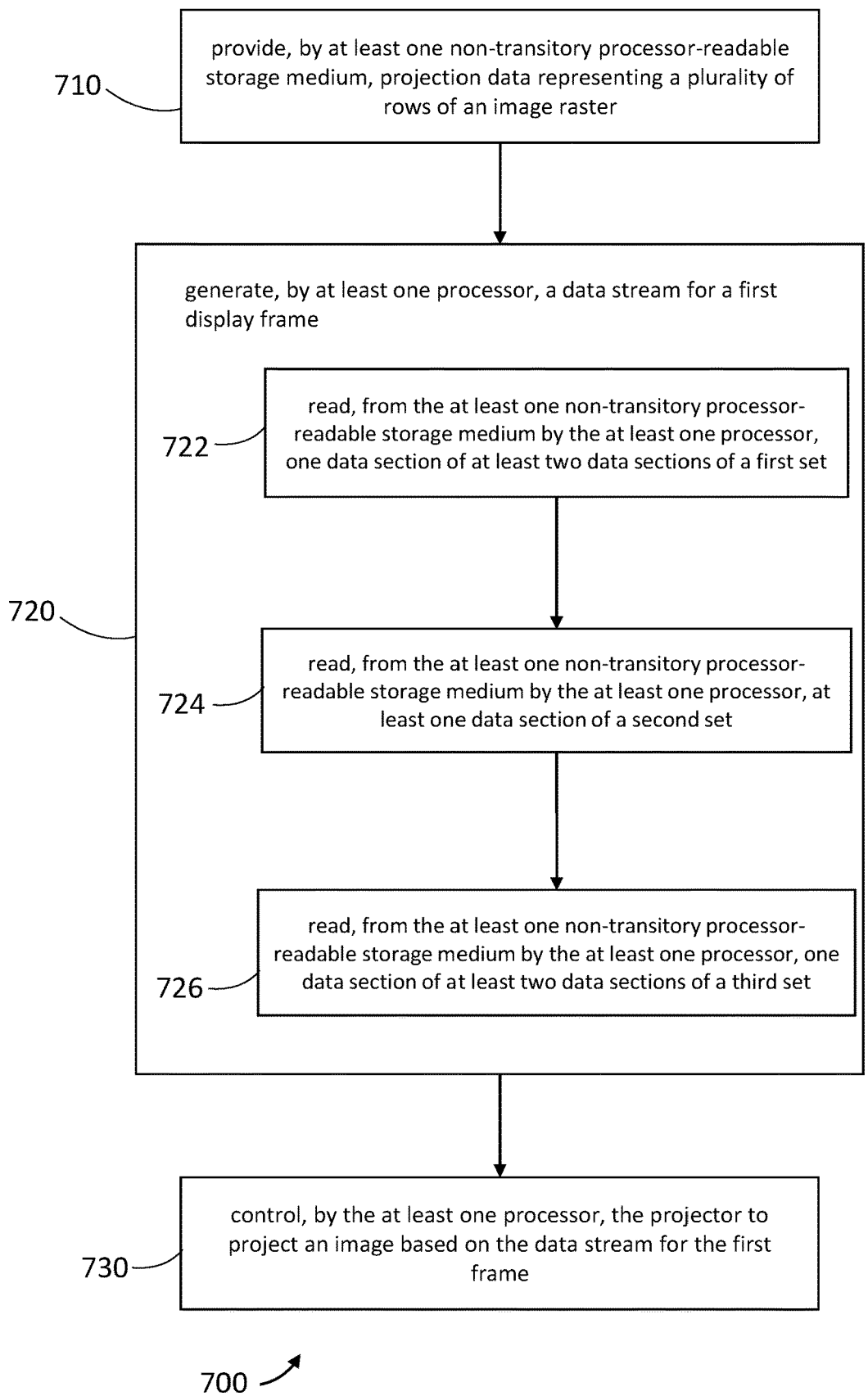
FIG. 7A is a flowchart which illustrates an exemplary method for controlling a projector based on projection data in accordance with one exemplary implementation of the present systems, devices, and methods.

FIG. 7A is a flowchart which illustrates an exemplary method 700 for reading projection data and controlling a projector based on the projection data. For exemplary hardware arrangements which can perform the acts of method 700, please see FIGS. 10A, 10B, and 10C, and the corresponding description. Method 700 includes: act 710 of providing, by at least one non-transitory processor-readable storage medium, projection data representing a plurality of rows of an image raster; act 720 of generating, by at least one processor, a data stream for a first display frame; and act 730 of controlling, by the at least one processor, the projector to project an image based on the data stream. Act 720 includes sub-acts 722, 724, and 726. The acts of method 700 are discussed in detail below.

In act 710, at least one non-transitory processor-readable storage medium provides projection data representing a plurality of rows of an image raster. This projection data can be similar to projection data 500B illustrated in FIG. 5B. In particular, the projection data can represent at least one row of an image raster (such as image raster 600 shown in FIG. 6A), and for each row of the image raster, the projection data can include: a first set of at least two data sections, the at least two data sections of the first set being different representations of a first portion of the row in the image raster; a second set of at least one data section, the at least one data section of the second set representing a second portion of the row in the image raster; and a third set of at least two data sections, the at least two data sections of the third set being different representations of a third portion of the row in the image raster. The projection data could be generated according to any of the techniques described with reference to FIGS. 4 and 6A-6F discussed above.

Figure 7B:
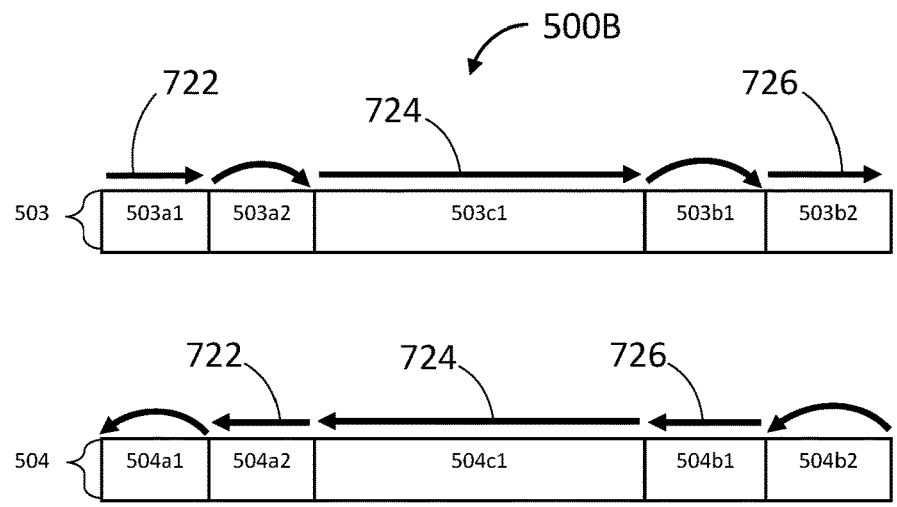
FIGS. 7B-7E are visual representations of acts of the method of FIG. 7A.

Act 720 and the sub-acts included therein are discussed in detail with reference to FIG. 7B below. FIG. 7B shows a region of the provided projection data, such as projection data 500B shown in FIG. 5B. However, FIG. 7B focuses on projection data which represents row 503 and row 504 of desired image 500A. The selection of row 503 and row 504 is intended to illustrate that method 700 can be performed on any given region of the projection data. This can include regions of the projection data which represent rows at the edge of the desired image, such as row 501 and row 505. Method 700 could be applied to any number of rows represented by the projection data by repeating the sub-acts within act 720 as appropriate.

Act 722 comprises reading, from the at least one non-transitory processor-readable storage medium by the at least one processor, one data section of the at least two data sections of the first set. Act 724 comprises reading, from the at least one non-transitory processor-readable storage medium by the at least one processor, at least one data section of a second set. Act 726 comprises reading, from the at least one non-transitory processor-readable storage medium by the at least one processor, one data section of at least two data sections of a third set. In essence, one data section from each of the first set, the second set, and the third set of a given row is included in the data stream for one display frame.

In some implementations, the projection data can be in a format such that for a first row in the image raster, the at least two data sections in the first set for the first row can include a first data section of the first set for the first row at least partially representing an area of the image raster spatially preceding the first portion of the first row in the image raster, and a second data section of the first set for the first row at least partially representing an area of the image raster spatially succeeding the first portion of the first row in the image raster. Similarly, the projection data can be in a format such that the at least two data sections in the third set for the first row can include a first data section of the third set for the first row at least partially representing an area of the image raster spatially preceding the third portion of the first row in the image raster, and a second data section of the third set for the first row at least partially representing an area of the image raster spatially succeeding the third portion of the first row in the image raster. Generation of projection data of this format is described above with reference to FIGS. 4, 5A-B, and 6A-6F.

When projection data of the above format is provided in act 710, the sub-acts of 720 can be specified as follows:

Act 722 can comprise reading, from the at least one non-transitory processor-readable storage medium by the at least one processor, the first data section of the first set. Act 726 can comprise reading, from the at least one non-transitory processor-readable storage medium by the at least one processor, the second data section of the third set.

The projection data can also include a representation of more than one row of the image raster. As an example, the projection data can include a representation of a second row of the image raster, including a first set of at least two data sections for the second row, a second set of at least one data section for the second row, and a third set of at least two data sections for the second row. The projection data can be in a format such that for the second row, the at least two data sections in the first set for the second row can include a first data section of the first set for the second row at least partially representing an area of the image raster spatially preceding the first portion of the second row in the image raster, and a second data section of the first set for the second row at least partially representing an area of the image raster spatially succeeding the first portion of the second row in the image raster. The second set of at least one data section for the second row can represent a second portion of the second row. Further, the at least two data sections in the third set for the second row can include a first data section of the third set for the second row at least partially representing an area of the image raster spatially preceding the third portion of the second row in the image raster, and a second data section of the third set for the second row at least partially representing an area of the image raster spatially succeeding the third portion of the second row in the image raster.

As mentioned above, the sub-acts within act 720 can be repeated for any number of rows. Further, which data sections are read for each row can be determined according to a projection pattern, such as the projection patterns illustrated in FIGS. 2A and 2B. For a scanning laser projector, due to the zig-zag shaped projection pattern as detailed above, for a given first portion or third portion, respective first data sections and second data sections should be projected alternatingly between adjacent rows. FIG. 7B illustrates a pattern for reading data sections for the exemplary first and second rows discussed above.

In the example illustrated in FIG. 7B, act 722 performed with respect to first row 503 comprises reading, from the non-transitory processor-readable storage medium, the first data section 503$a1$ of the first set for the first row 503, as shown by a straight arrow. The second data section 503$a2$ of the first set for the first row 503 is skipped as shown by a curved arrow. Act 724 performed with respect to first row 503 comprises reading, from the non-transitory processor-readable storage medium, a data section 503$c1$ of the second set for row 503. Act 726 performed with respect to first row 503 comprises reading, from the non-transitory processor-readable storage medium, a second data section 503$b2$ of the third set for row 503. First data section 503$b1$ of the third set for row 503 is skipped, as shown by a curved arrow.

With respect to row 504, act 726 comprises reading, from the non-transitory processor-readable storage medium, a first data section 504$b1$ of the third set for row 504. Second data section 504$b2$ of the third set is skipped, as shown by a curved arrow. Act 724 for the second row 504 comprises reading, from the non-transitory processor-readable storage medium, a data section 504$c1$ of the second set for row 504. Act 722 for row 504 comprises reading, from the non-transitory processor-readable storage medium, a second data section 504$a2$ for the first set for row 504. First data section 504$a1$ of the first set for row 504 is skipped, as shown by a curved arrow.

The order in which each data section is read is arbitrary, and the data sections could be read in any appropriate order, provided the order is consistent with how the projection data was provided and the projection pattern according to which the projector is being driven. For example, in the examples of FIGS. 6B, 6C, 6D, and 6E, each the first data section of the first set and first data section of the third set represent an area of the desired image which precedes the row for which the projection data is being generated, whereas each second data section of the first set and second data section of the third set represent an area of the desired image which succeeds the row for which the projection data is being generated. Consequently, for projection data provided in this manner, when the projector is being operated according to projection pattern 210 illustrated in FIG. 2A, the sub-acts of act 720 should be carried out in the order shown in FIG. 7B. On the other hand, FIGS. 8A-8E discuss cases where the projector is operated according to projection pattern 220 illustrated in FIG. 2B.

When reading each data section in the projection data, the at least one processor should be able to distinguish when each data section begins and ends. Several exemplary techniques are described below to address this.

In one example, the projection data could include a respective data flag preceding and/or succeeding each data section in the projection data. Each operation of reading a data section by at least one processor can comprise the at least one processor reading a respective flag corresponding to the respective data section, and determining that the respective data section should be read according to a projection pattern. For example, each flag could indicate whether the respective data section is a first data section of the first set, a second data section of the first set, a data section of the second set, a first data section of the third set, or a second data section of the third set. This indication could be compared to a projection pattern which indicates which data sections should be read, such that appropriate data sections are read and appropriate data sections are skipped.

In another example, each of the at least two data sections in each first set can have a first predetermined size, each of the at least one data section in each second set can have a second predetermined size, and each of the at least two data sections in each third set can have a third predetermined size. Each operation of reading a data section can comprise reading the respective data section according to the predetermined size of the respective data section. For example, a projection pattern could indicate what data sections are to be read and in what order. From this, a sequence of read and skip operations could be determined, in which sections are read or skipped according to the predetermined sizes.

In another example, each data section can be stored at a respective address in the non-transitory processor-readable storage medium, and each operation of reading a data section can comprise reading the respective data section according to the address of the respective data section. For example, a projection pattern could indicate what data sections are to be read and in what order. From this, a sequence of read operations could be determined, in which an address is defined at which each read operation will begin.

Figure 7C:
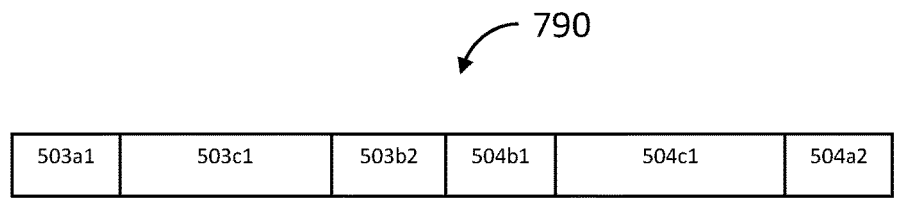

FIG. 7C illustrates an exemplary data stream 790 produced by the sub-acts within act 720. After generating this data stream, at act 730 in method 700 of FIG. 7A, a projector can be controlled to project an image based on the data stream 790. For example, the MEMS mirrors of the projector could scan across a display area according to projection pattern 210 in FIG. 2A. Simultaneously, at least one laser of the projector could be driven to output a light beam which represents content of the data stream. That is, the data stream can represent a sequence of pixel values, and the at least one laser of the projector could output laser light in a sequence which matches the sequence defined in the data stream.

Figure 7D:
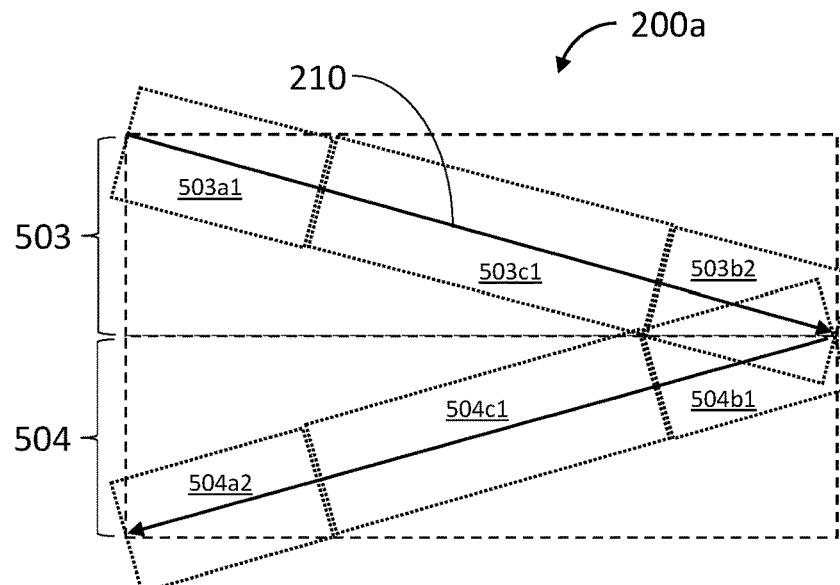

FIG. 7D illustrates an exemplary result of method 700 of FIG. 7A, which includes row 503 and row 504 as projected according to projection pattern 210 in FIG. 2A, based on the data stream 790 in FIG. 7C. The data sections 503a1, 503b2, 504b1, and 504a2 will produce a more accurate representation of the desired image since they effectively compensate for the slant of the projection pattern.

Figure 7E:
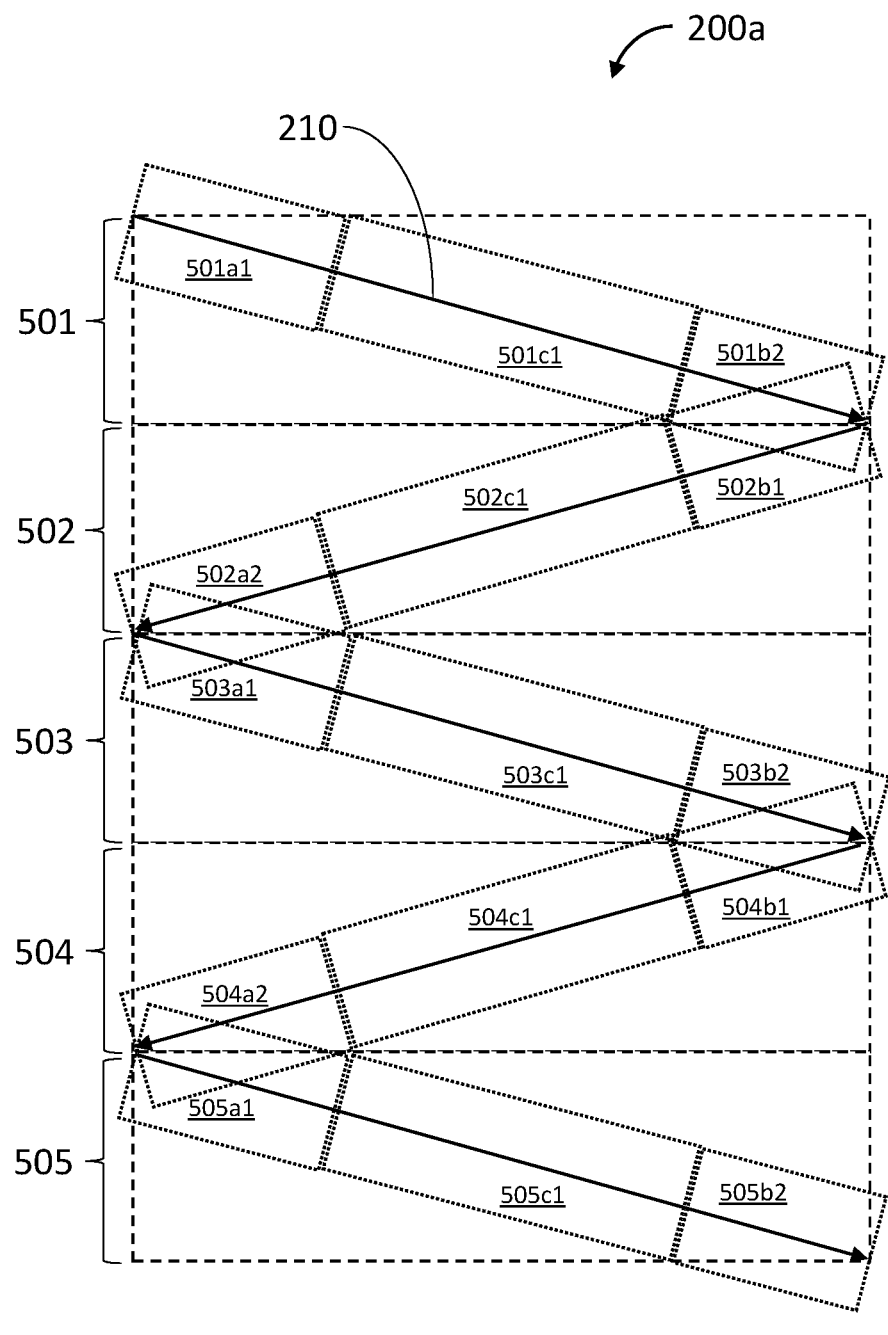

FIG. 7E illustrates an exemplary projected image resulting from method 700 of FIG. 7A being repeated for each of the rows in the desired image 500A.

Figure 8A:
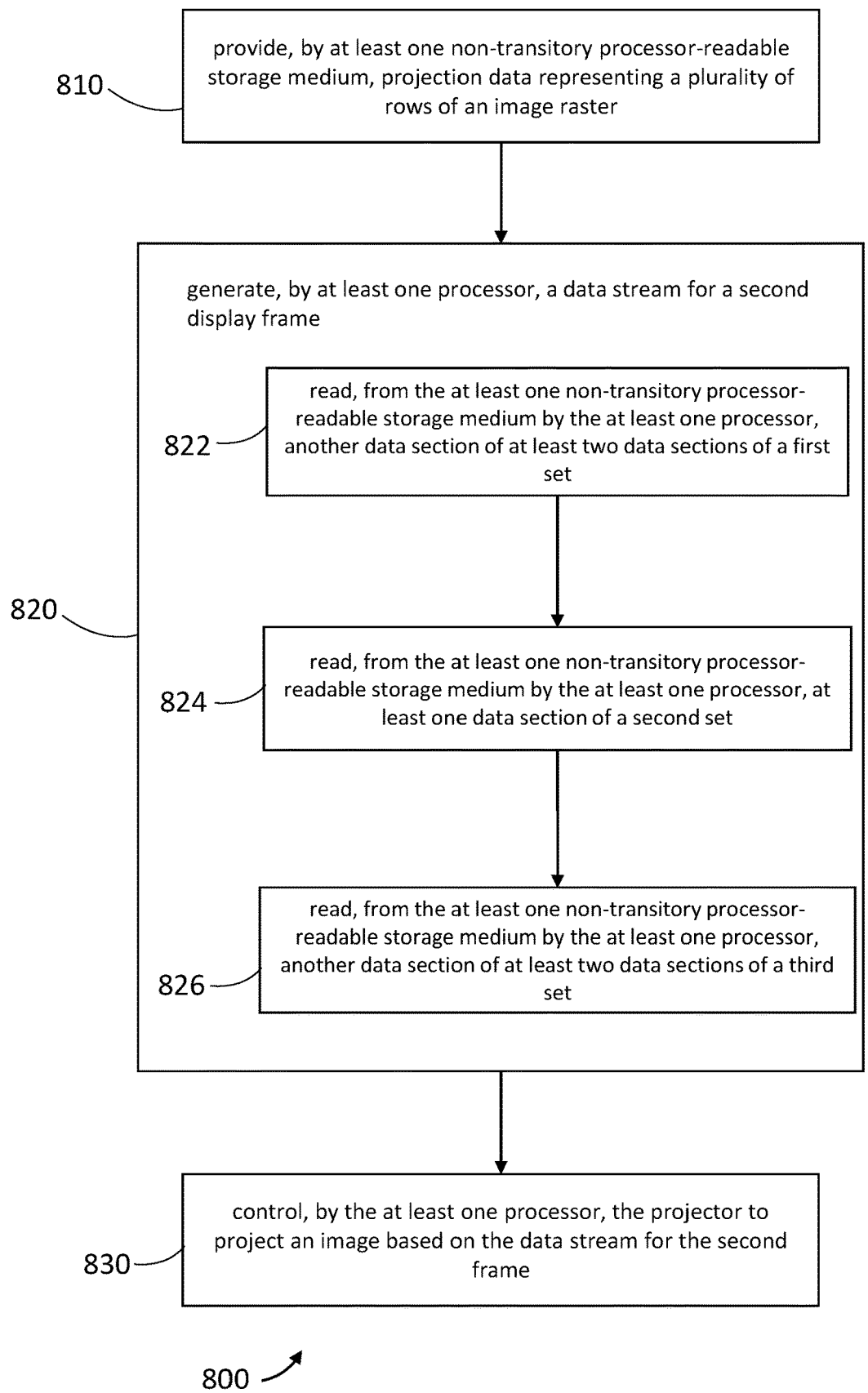
FIG. 8A is a flowchart which illustrates an exemplary method for controlling a projector based on projection data in accordance with one exemplary implementation of the present systems, devices, and methods.

FIG. 8A is a flowchart which illustrates an exemplary method 800 for reading projection data and controlling a projector based on the projection data. For exemplary hardware arrangements which can perform the acts of method 800, please see FIGS. 10A, 10B, and 10C, and the corresponding description. Method 800 is similar to method 700 of FIG. 7A, except that method 800 is for an alternate projection pattern to method 700. Method 800 includes: act 810 of providing, by at least one non-transitory processor-readable storage medium, projection data representing a plurality of rows of an image raster; act 820 of generating, by at least one processor, a data stream for a second display frame; and act 830 of controlling, by the at least one processor, the projector to project an image based on the data stream for the second frame. Act 820 includes sub-acts 822, 824, and 826. The acts of method 800 are discussed in detail below.

In act 810, at least one non-transitory processor-readable storage medium provides projection data representing a plurality of rows of an image raster. Act 810 can be similar to act 710 of method 700 in FIG. 7, in that similar projection data can be provided. This projection data can be similar to projection data 500B illustrated in FIG. 5B. In particular, the projection data can represent at least one row of an image raster (such as image raster 600 shown in FIG. 6A), and for each row of the image raster, the projection data can include: a first set of at least two data sections, the at least two data sections of the first set being different representations of a first portion of the row in the image raster; a second set of at least one data section, the at least one data section of the second set representing a second portion of the row in the image raster; and a third set of at least two data sections, the at least two data sections of the third set being different representations of a third portion of the row in the image raster. The projection data could be generated according to any of the techniques described with reference to FIGS. 4 and 6A-6F discussed above.

Figure 8B:
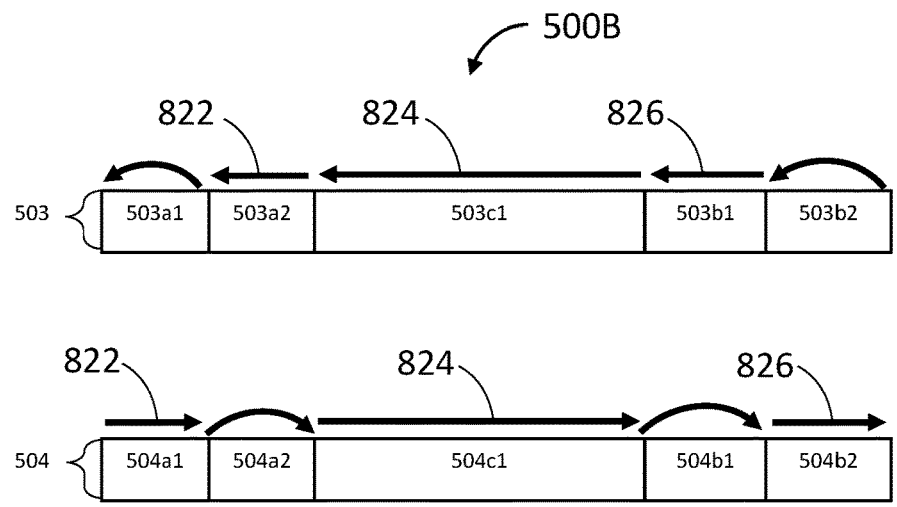
FIGS. 8B-8E are visual representations of acts of the method of FIG. 8A.

Act 820 and the sub-acts included therein are discussed in detail with reference to FIG. 8B below. FIG. 8B shows a region of the provided projection data, such as projection data 500B shown in FIG. 5B. However, FIG. 8B focuses on projection data which represents row 503 and row 504 of desired image 500A. The selection of row 503 and row 504 is intended to illustrate that method 800 can be performed on any given region of the projection data. This can include regions of the projection data which represent rows at the edge of the desired image, such as row 501 and row 505. Method 800 could be applied to any number of rows of projection data by repeating the sub-acts within act 820 as appropriate.

Act 822 comprises reading, from the at least one non-transitory processor-readable storage medium by the at least one processor, one data section of the at least two data sections of the first set. Act 824 comprises reading, from the at least one non-transitory processor-readable storage medium by the at least one processor, at least one data section of a second set. Act 826 comprises reading, from the at least one non-transitory processor-readable storage medium by the at least one processor, one data section of at least two data sections of a third set. In essence, one data section from each of the first set, the second set, and the third set of a given row is included in the data stream for the second display frame.

Similar to as discussed with reference to FIG. 7A, in some implementations, the projection data can be in a format such that for a first row in the image raster, the at least two data sections in the first set for the first row can include a first data section of the first set for the first row at least partially representing an area of the image raster spatially preceding the first portion of the first row in the image raster, and a second data section of the first set for the first row at least partially representing an area of the image raster spatially succeeding the first portion of the first row in the image raster. Similarly, the projection data can be in a format such that the at least two data sections in the third set for the first row can include a first data section of the third set for the first row at least partially representing an area of the image raster spatially preceding the third portion of the first row in the image raster, and a second data section of the third set for the first row at least partially representing an area of the image raster spatially succeeding the third portion of the first row in the image raster. Generation of projection data of this format is described above with reference to FIGS. 4, 5A-B, and 6A-6F.

When projection data of the above format is provided in act 810, the sub-acts of 820 can be specified as follows:

Act 822 can comprise reading, from the at least one non-transitory processor-readable storage medium by the at least one processor, the second data section of the first set. Act 826 can comprise reading, from the at least one non-transitory processor-readable storage medium by the at least one processor, the first data section of the third set.

The projection data can also include a representation of more than one row of the image raster. As an example, the projection data can include a representation of a second row of the image raster, including a first set of at least two data sections for the second row, a second set of at least one data section for the second row, and a third set of at least two data sections for the second row. The projection data can be in a format such that for the second row, the at least two data sections in the first set for the second row can include a first data section of the first set for the second row at least partially representing an area of the image raster spatially preceding the first portion of the second row in the image raster, and a second data section of the first set for the second row at least partially representing an area of the image raster spatially succeeding the first portion of the second row in the image raster. The second set of at least one data section for the second row can represent a second portion of the second row. Further, the at least two data sections in the third set for the second row can include a first data section of the third set for the second row at least partially representing an area of the image raster spatially preceding the third portion of the second row in the image raster, and a second data section of the third set for the second row at least partially representing an area of the image raster spatially succeeding the third portion of the second row in the image raster.

As mentioned above, the sub-acts within act 820 can be repeated for any number of rows. Further, which data sections are read for each row can be determined according to a projection pattern, such as the projection patterns illustrated in FIGS. 2A and 2B. For a scanning laser projector, due to the zig-zag shaped projection pattern as detailed above, for a given first portion or third portion, respective first data sections and second data sections should be projected alternatingly between adjacent rows. FIG. 8B illustrates a pattern for reading data sections for the exemplary first and second rows discussed above.

In the example illustrated in FIG. 8B, act 826 performed with respect to first row 503 comprises reading, from the non-transitory processor-readable storage medium, the first data section 503$b$1 of the third set for the first row 503, as shown by a straight arrow. The second data section 503$b$2 of the third set for the first row 503 is skipped as shown by a curved arrow. Act 824 performed with respect to first row 503 comprises reading, from the non-transitory processor-readable storage medium, a data section 503$c$1 of the second set for row 503. Act 822 performed with respect to first row 503 comprises reading, from the non-transitory processor-readable storage medium, a second data section 503$a$2 of the first set for row 503. First data section 503$a$1 of the first set for row 503 is skipped, as shown by a curved arrow.

With respect to row 504, act 822 comprises reading, from the non-transitory processor-readable storage medium, a first data section 504$a$1 of the first set for row 504. Second data section 504$a$2 of the first set is skipped, as shown by a curved arrow. Act 824 for the second row 504 comprises reading, from the non-transitory processor-readable storage medium, a data section 504$c$1 of the second set for row 504. Act 826 for row 504 comprises reading, from the non-transitory processor-readable storage medium, a second data section 504$b$2 for the third set for row 504. First data section 504$b$1 of the third set for row 504 is skipped, as shown by a curved arrow.

The order in which each data section is read is arbitrary, and the data sections could be read in any appropriate order, provided the order is consistent with how the projection data was provided and the projection pattern according to which the projector is being driven. For example, in the examples of FIGS. 6B, 6C, 6D, and 6E, each of the first data section of the first set and first data section of the third set represent an area of the desired image which precedes the row for which the projection data is being generated, whereas each of the second data section of the first set and the second data section of the third set represent an area of the desired image which succeeds the row for which the projection data is being generated. Consequently, for projection data provided in this manner, when the projector is being operated according to projection pattern 220 illustrated in FIG. 2B, the sub-acts of act 820 should be carried out in the order shown in FIG. 8B.

Similar to as discussed with reference to method 700 above, when reading each data section in the projection data, the at least one processor should be able to distinguish when each data section begins and ends. The techniques discussed above, such as respective data flags, predetermined sizes, and storage addresses could also be implemented in the context of method 800.

Figure 8C:
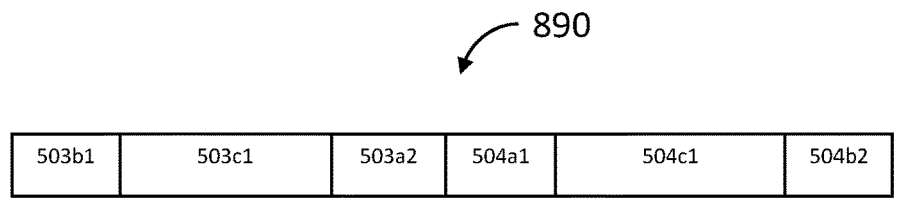

FIG. 8C illustrates an exemplary data stream 890 produced by the sub-acts within act 820. After generating this data stream, at act 830 in method 800 of FIG. 8A, a projector can be controlled to project an image based on the data stream 890. For example, the MEMS mirrors of the projector could scan across a display area according to projection pattern 220 in FIG. 2B. Simultaneously, at least one laser of the projector could be driven to output a light beam which represents content of the data stream. That is, the data stream can represent a sequence of pixel values, and the at least one laser of the projector could output laser light in a sequence which matches the sequence defined in the data stream.

Figure 8D:
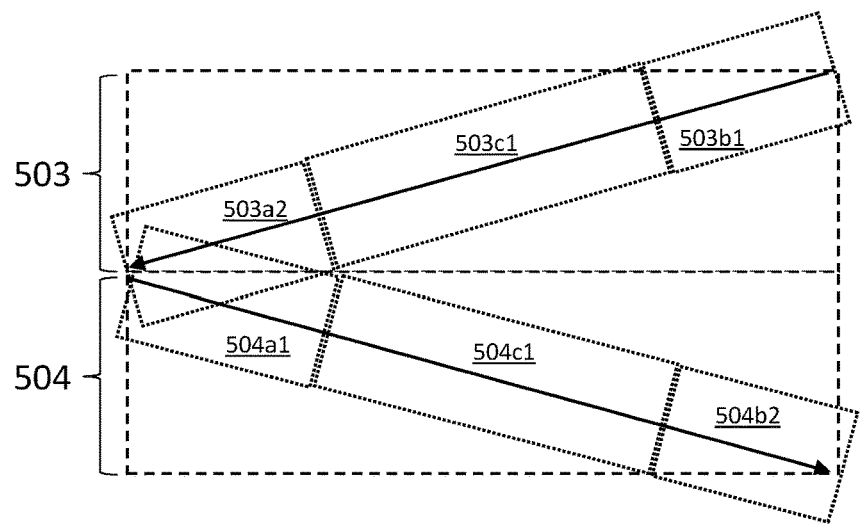

FIG. 8D illustrates an exemplary result of method 800 of FIG. 8A, which includes row 503 and row 504 as projected according to projection pattern 220 in FIG. 2B, based on the data stream 890 in FIG. 8C. The data sections 503$b$1, 503$a$2, 504$a$1, and 504$b$2 will produce a more accurate representation of the desired image since they effectively compensate for the slant of the projection pattern.

Figure 8E:
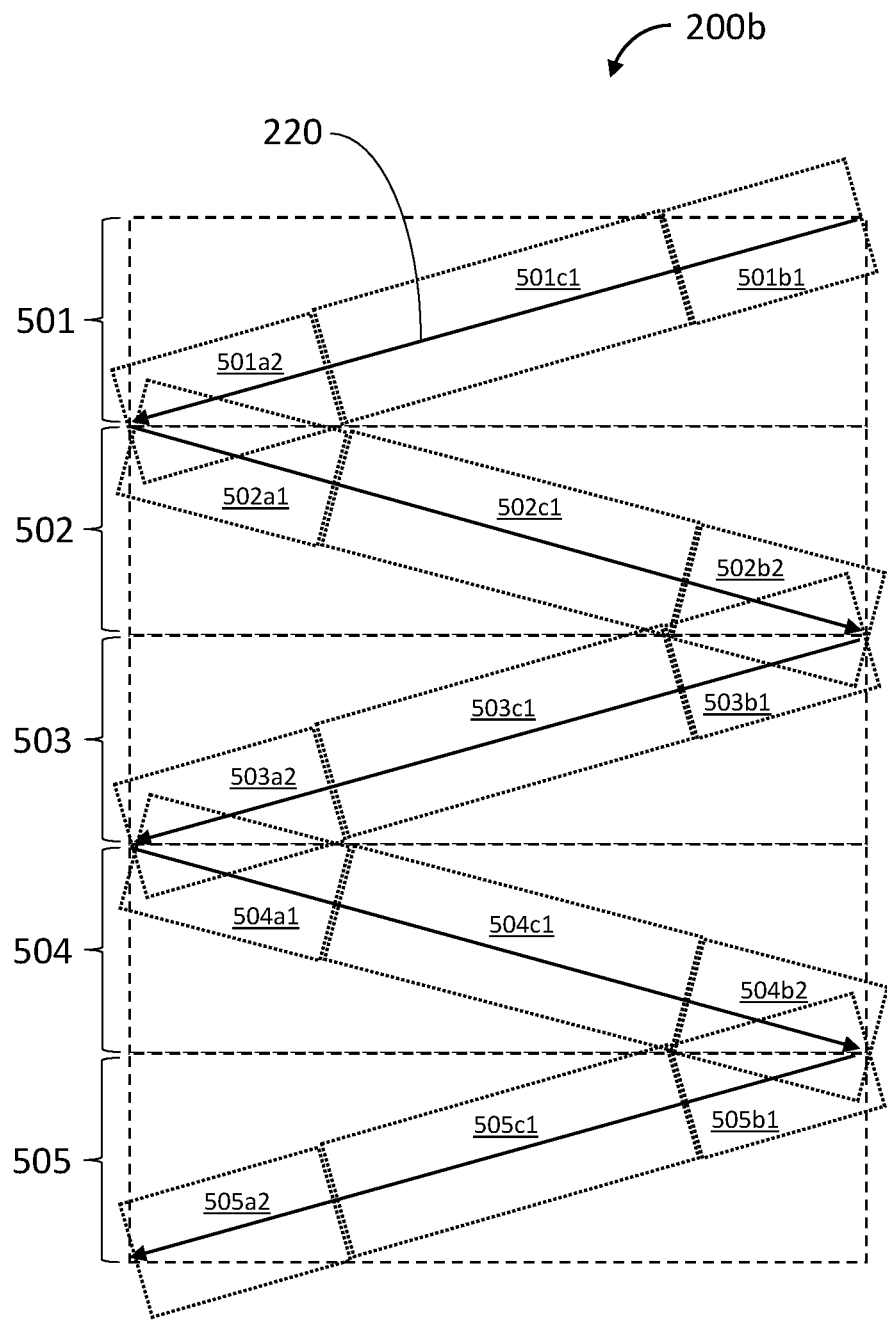

FIG. 8E illustrates an exemplary projected image resulting from method 800 of FIG. 8A being repeated for each of the rows in the desired image 500A.

Method 700 discussed with reference to FIGS. 7A-7E and method 800 discussed with reference to FIGS. 8A-8E can be performed alternatingly for each frame projected by the projector. For example, the projector could project a first frame according to method 700, a second frame according to method 800, and third frame according to method 700, a fourth frame according to method 800, and so on. By alternating projection patterns, the appearance of gaps at the edges of the image can be reduced since each individual gap will only be present every second frame. This concept is discussed above with reference to FIG. 2C. Further, FIG. 9 illustrates the effect of projecting the data sections in accordance with method 700 and method 800 alternatingly.

Figure 9:
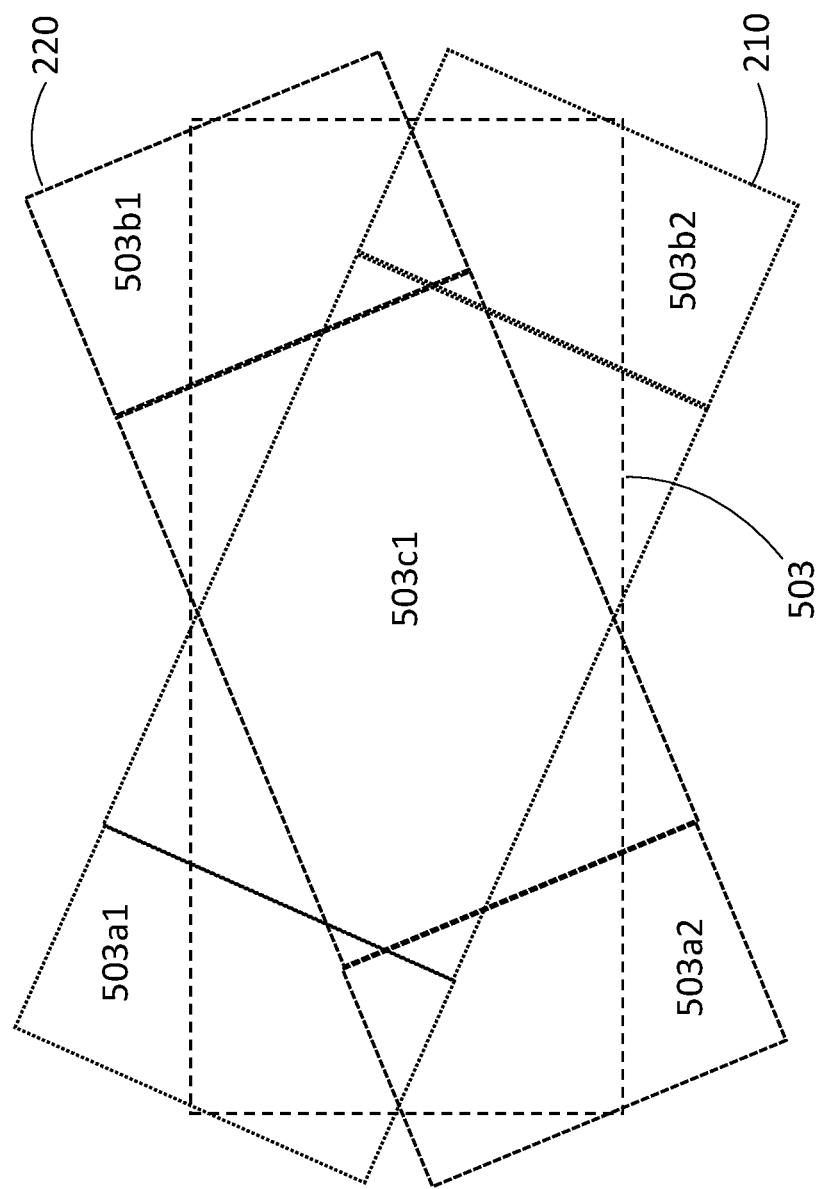
FIG. 9 is a representation of projection of a row of an image according to the methods illustrated in FIGS. 7A-7E and 8A-8E.

For a row 503 of an image raster, FIG. 9 illustrates projection of a first frame according to method 700 of FIG. 7A and projection pattern 210, and a second frame according to method 800 in FIG. 8A and projection pattern 220. The desired row area of row 503 is illustrated by a dashed box. Although projection of a single row is shown in FIG. 9 and discussed below, the discussion regarding FIG. 9 applies to each of the rows being projected. FIG. 9 contrasts with FIG. 3 discussed above. In FIG. 3, due to the spot size of the beam, the projected beam will extend outside of the desired row area at the edges of the image being projected. In FIG. 3, the result is that the image data for the edges of the image will be projected over a much larger area than the desired area of the row. Consequently, in FIG. 3, the edges of the projected image will overlap adjacent rows, causing blurring at the edges of the projected image. In FIG. 9 on the other hand, due to the projection of the first frame projected according to method 700 and projection pattern 210, the data which extends beyond the top-left edge of the desired row area represents first data section 503$a$1 of the first set, and the data which extends beyond the bottom-right edge of the desired row area represents second data section 503$b$2 of the third set. Additionally, due to the projection of the second frame according to method 800 and projection pattern 220, the data which extends beyond the top-right edge of the desired row area represents the first data section 503b1 of the third set, and the data which extends beyond the bottom-left edge of the desired row area represents the second data section 503a2 of the first set. Further as discussed with regards to FIGS. 6B-6E, each of these data sections represents an area of the desired image which lies between row 503 and either row 502 or row 504; that is, each of the data sections of the first set and the third set represents an area of the desired image similar to the area in which the respective data section is actually projected beyond the desired row area. Consequently, instead of having overlapping and blurred pixels at the edges of the image, resolution at the edges of the image is increased, improving image quality.

Additionally, it is possible, but not necessary, for the first display frame of method 700 and the second display frame of method 800 to represent identical image rasters. For example, a static user interface could be projected, in which the represented image raster is the same across multiple frames. However, it is also possible that the represented image raster changes between frames. For example, the projector could be controlled to project a changing user interface or a video. Even in such cases, the present systems, devices, and methods are useful, but the projection data for each frame will be based on a desired image to be displayed for that frame.

FIGS. 10A, 10B, and 10C are schematic views which illustrate exemplary systems for performing method 400 of FIG. 4, method 700 of FIG. 7A, and method 800 of FIG. 8A.

FIG. 10A is a schematic view which shows an exemplary system 1000A. In system 1000A, image data is provided to the system by an image source 1001. Image source 1001 could for example be an application processor, image rendering device, or video rendering device which produces image data to be displayed. Image source 1001 could be in direct wired or wireless communication with system 1000A. Alternatively, image source 1001 could be remote from system 1000A, and provide the image data to system 1000A through a network or the internet.

System 1000A can include a projection data processor 1011, which receives image data from image source 1001 and provides projection data based on the image data. Projection data processor 1011 can be any suitable component which can execute instructions or logic, including but not limited to a micro-controller, microprocessor, multi-core processor, integrated-circuit, ASIC, FGPA, programmable logic device, gate-level logic hardware, register-level logic hardware, or any appropriate combination of these components. Projection data processor 1011 can perform acts of method 400 of FIG. 4, such as acts 411, 421, and 431, which focus on providing the first, second, and third sets of data sections discussed above. Further, each of these acts can be performed as described with reference to FIGS. 6A-6F. Inclusion of image source 1001 is optional, and projection data processor 1011 can generate and/or render projection data directly without receiving image data from an image source, such as described with reference to FIG. 6E above. Further, projection data processor 1011 can execute instructions stored on a non-transitory processor-readable storage medium to control at least some aspects of system 1000A. Such instructions could be stored on non-transitory processor-readable storage medium 1012 discussed below, or could be stored on a separate non-transitory processor-readable storage medium. As non-limiting examples, such instructions could, when executed, cause projection data processor 1011 to perform acts 411, 421, and 431 of method 400, or to generate and/or render projection data as discussed above. Similarly, such instructions could, when executed, cause non-transitory processor-readable storage medium 1012 to perform acts 413, 423, and 433 of method 400.

Projection data processor 1011 can provide the first, second, and third sets of data sections to at least one non-transitory processor-readable storage medium 1012, where the data sections are stored as projection data, as in acts 413, 423, and 433 of method 400. Non-transitory processor-readable storage medium 1012 can be any suitable component which can store data, including but not limited to non-volatile or volatile memory, read only memory (ROM), random access memory (RAM), FLASH memory, registers, magnetic hard disk, optical disk, or any combination of these components.

System 1000A can further include a control data processor 1021, which reads at least a portion of the projection data stored in non-transitory processor-readable storage medium 1012, and provides control data such as a data stream to a projection controller 1030. Control data processor 1021 can be any suitable component which can execute instructions or logic, including but not limited to a micro-controller, microprocessor, multi-core processor, integrated-circuit, ASIC, FGPA, programmable logic device, gate-level logic hardware, register-level logic hardware, or any appropriate combination of these components. Further, in some implementations as illustrated in FIG. 10A, control data processor 1021 can be dedicated processing hardware separate from projection data processor 1011. On the other hand, in some implementations, projection data processor 1011 and control data processor 1021 may be the same processing hardware. Control data processor 1021 can perform acts of method 700 of FIG. 7A and acts of method 800 of FIG. 8A. For example, each of acts 720, 722, 724, and 726, as well as each of acts 820, 822, 824, and 826 can be performed by the control data processor 1021. That is, the acts which focus on reading sections of the projection data and generating a data stream can be performed by the control data processor 1021. Further, each of these acts can be performed as described with reference to FIGS. 7B, 7C, 8B, and 8C. Further still, control data processor 1021 can execute instructions stored on a non-transitory processor-readable storage medium which control at least some aspects of system 1000A. Such instructions could be stored on non-transitory processor-readable storage medium 1012 discussed above, or could be stored on a separate non-transitory processor-readable storage medium. As non-limiting examples, such instructions could cause control data processor 1021 to perform acts 720, 722, 724, and 726 of method 700 and acts 820, 822, 824, and 826 of method 800 as discussed above.

System 1000A can further include a scanning laser projector including at least one laser 1041 and at least one controllable reflector 1042. The at least one laser 1041 could include are least three laser diodes which output light of different wavelengths (i.e. colors). This could include a red laser diode, a green laser diode, and a blue laser diode, though other wavelength combinations are possible. Further, laser diodes of other wavelengths such as infrared could be included to provide illumination for systems like infrared eye tracking in wearable-heads-up display applications. The at least one laser 1041 outputs at least one light beam to the at least one controllable reflector 1042, which scans the at least one light beam over a scan area. As examples, the at least one controllable reflector 1042 could include a single controllable reflector rotatable in at least two directions, or could include two controllable reflectors rotatable in different directions as illustrated in FIG. 10A. The at least one controllable reflector 1042 can for example comprise at least one MEMS mirror.

The scanning laser projector can be controlled by (and optionally include) a projector controller 1030. Projector controller 1030 can include or interact with a laser controller 1031 (such as laser diode driver circuitry) and a controllable reflector controller 1032 (such as MEMS mirror driver circuitry). Projector controller 1030 can receive the control data from the control data processor 1021 and control the projector to project an image representing content of the control data, as in act 740 of method 700 and act 840 of method 800. Further, these acts can be performed as described with reference to FIGS. 7D, 7E, 8D, and 8E. For example, controllable reflector controller 1032 can control controllable reflectors 1042 of the projector to scan according to projection pattern 210 described with reference to FIG. 2A and projection pattern 220 described with reference to FIG. 2B. During scanning of controllable reflectors 1042, laser controller 1031 can drive at least one laser 1041 to output at least one light beam towards controllable reflectors 1042, the at least one light beam being output according to a data stream of pixel data included in the control data, such as data stream 790 or data stream 890. In some implementations, projector controller 1030 may be a hardware component which includes and/or controls laser controller 1031 and controllable reflector controller 1032, and can be any suitable component which can execute instructions or logic, including but not limited to a micro-controller, microprocessor, multi-core processor, integrated-circuit, ASIC, FGPA, programmable logic device, gate-level logic hardware, register-level logic hardware, or any appropriate combination of these components. In other implementations, projector controller 1030 may be common processing hardware with projection data processor 1011 and control data processor 1021. In some implementations, projector controller 1030 may be processing hardware separate from laser controller 1031 and controllable reflector controller 1032. An example of such an implementation could be an arrangement where laser controller 1031 comprises laser diode driver circuitry included in the projector, controllable reflector controller 1032 comprises MEMS mirror driver circuitry included in the projector, and projector controller 1030 comprises processing hardware which provides control and timing signals to laser controller 1031 and controllable reflector controller 1032. Further, projector controller 1030, laser controller 1031, and controllable reflector controller 1032 can be controlled by instructions stored on a non-transitory processor-readable storage medium. Such instructions could be stored on non-transitory processor-readable storage medium 1012 discussed above, or could be stored on a separate non-transitory processor-readable storage medium. As non-limiting examples, such instructions could cause projector controller 1030, laser controller 1031, and controllable reflector controller 1032 to project an image as discussed above.

As mentioned above, each of projection data processor 1011, control data processor 1021, and projector controller 1030 can be different functionality performed by the same processing hardware. Alternatively, some or all of projection data processor 1011, control data processor 1021, and projector controller 1030 can comprise separate processing hardware.

FIG. 10B is a schematic view which shows an exemplary system 1000B, which is similar in at least some respects to system 1000A shown in FIG. 10A. Unless context clearly dictates otherwise, much of the description of system 1000A is applicable to system 1000B.

One difference between system 1000B and system 1000A is that system 1000B shows projection data subsystem 1010 and control data subsystem 1020, which can be physically separate subsystems. Projection data subsystem 1010 includes the projection data processor 1011, a first non-transitory processor-readable storage medium 1012, and a first communications module 1013. Control data subsystem includes control data processor 1021, a second non-transitory processor-readable storage medium 1022, and a second communications module 1023. Projection data processor 1011 and control data processor 1021 can perform similar operations to those described above with reference to FIG. 10A. Further, although FIG. 10B shows projection data processor 1011 as receiving data from an image source 1001, it is possible for projection data processor 1011 to directly generate and/or render projection data, such as discussed above with reference to FIG. 6E.

Data (such as projection data) can be exchanged between projection data subsystem 1010 and control data subsystem 1020 across a communicative coupling between first communications module 1013 and second communications module 1023. As one example, first communications module 1013 and second communications module 1023 can be wireless communications modules, such that the communicative coupling between projection data subsystem 1010 and control data subsystem 1020 is a wireless communicative coupling. As another example, first communications module 1013 and second communications module 1023 can be wired communications modules, such that the communicative coupling between projection data subsystem 1010 and control data subsystem 1020 is a wired communicative coupling.

Further, projection data subsystem 1010 could be controlled by instructions stored on first non-transitory processor-readable storage medium 1012, which are executed by projection data processor 1011. Such instructions could be similar to those discussed above regarding projection data processor 1011. Similarly, control data subsystem 1020 could be controlled by instructions stored on second non-transitory processor-readable storage medium 1022, which are executed by control data processor 1021. Such instructions could be similar to those discussed above with reference to control data processor 1021. Similarly, projector controller 1030, laser controller 1031, and controllable reflector controller 1032 can be controlled by instructions stored on a third non-transitory processor-readable storage medium (not shown), similar to as discussed above with reference to projector controller 1030.

FIG. 10B shows projector controller 1030 as being separate from projection data subsystem 1010 and control data subsystem 1020. However, in some implementations, it is possible for projector controller 1030 to be included in control data subsystem 1020. In such an implementation, control data processor 1020 can control laser controller 1031 and controllable reflector controller 1032, for example according to instructions stored in second non-transitory processor-readable storage medium 1022.

One practical application of system 1000B could be a system comprising a wearable heads-up display ("WHUD") and a remote processing unit. The remote processing unit could include projection data subsystem 1010, whereas the WHUD could include control data subsystem 1020, projector controller 1030, laser 1041, and at least one controllable reflector 1042. In use, the remote processing unit could generate projection data, and provide this projection data to the WHUD for projection. Such an arrangement would move some processing off of the WHUD, thereby enabling smaller components and/or lower power consumption on the WHUD.

FIG. 10C is a schematic view which shows an exemplary system 1000C, which is similar in at least some respects to system 1000A shown in FIG. 10A and system 1000B shown in FIG. 10B. Unless context clearly dictates otherwise, much of the description of systems 1000A and 1000B are applicable to system 1000C.

One difference between system 1000C and systems 1000A and 1000B is that in system 1000C, a unified processor 1014 performs at least the operations which are performed by projection data processor 1011 and control data processor 1021 in system 1000A and system 1000B. Unified processor 1014 can be any suitable component which can execute instructions or logic, including but not limited to a micro-controller, microprocessor, multi-core processor, integrated-circuit, ASIC, FGPA, programmable logic device, gate-level logic hardware, register-level logic hardware, or any appropriate combination of these components. Further, unified processor 1014 may also perform the functions of projector controller 1030, by controlling laser controller 1031 and controllable reflector controller 1032. In some implementations, unified processor 1014 may consist of a single hardware component, such as a single microprocessor, a single multi-core processor, a single ASIC, a single FPGA, etc. In other implementations, unified processor 1014 may comprise a plurality or network of versatile hardware components which together can be considered as a single unified processor. As an example of such an implementation, unified processor 1014 may comprise a plurality of generic interconnected processors which are each capable of performing the same tasks, and where the specific operations performed by each processor at a given time are changeable and can be assigned based on which processor has available resources. In such implementations, the unified processor 1014 can function as a "single unified processor", even if the unified processor contains a plurality of hardware processing components.

Another difference between system 1000C and systems 1000A and 1000B is that in system 1000C, instead of receiving image data from an image source 1001, image data can be generated directly by unified processor 1014. This image data can be generated as a desired image for subsequent conversion to projection data, similarly to as discussed with reference to FIGS. 6B-6D, 10A, and 10B. Alternatively, the projection data can be generated directly, such as discussed above with reference to FIG. 6E above. However, it is still possible for unified processor 1014 to receive image data from an image source for processing.

Further, unified processor 1014 can be controlled by instructions stored on a non-transitory processor-readable storage medium. Such instructions could be stored on non-transitory processor-readable storage medium 1012, or could be stored on a separate non-transitory processor-readable storage medium. As non-limiting examples, such instructions could cause unified processor 1014 to generate projection data and to control laser controller 1031 and controllable reflector controller 1032 as discussed above.

Further, it is possible in the system 1000A of FIG. 10A for projection data processor 1011 to generate image data and/or projection data directly, similarly to unified processor 1014. Further still, it is possible in the system 1000B of FIG. 10B for projection data processor 1011 to generate image data and/or projection data directly, similarly to unified processor 1014.

A person of skill in the art will appreciate that the various embodiments described herein may be applied in non-WHUD applications. For example, the present systems, devices, and methods may be applied in non-wearable heads-up displays, such as wall-projectors.

In some implementations, one or more optical fiber(s) may be used to guide light signals along some of the paths illustrated herein.

Throughout this specification and the appended claims, infinitive verb forms are often used. Examples include, without limitation: "to output," "to provide," "to project," "to display," and the like. Unless the specific context requires otherwise, such infinitive verb forms are used in an open, inclusive sense, that is as "to, at least, output," to, at least, provide," "to, at least, project," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable storage medium for use by or in connection with any processor-related system or method. In the context of this disclosure, a memory is a processor-readable storage medium that is an electronic, magnetic, optical, or other physical device or means that contains or stores a computer and/or processor program. Logic and/or the information can be embodied in any processor-readable storage medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable storage medium" can be any element that can store the program associated with logic and/or information for use by or in connection with the instruction execution system, apparatus, and/or device. The processor-readable storage medium can be, for example, but is not limited to, an electronic, magnetic, optical, electromagnetic, infrared, or semiconductor system, apparatus or device. More specific examples (a non-exhaustive list) of the computer readable storage medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification, including US Patent Publication No. 2016/0349514 and U.S. Provisional Patent Application No. 62/863,935, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of processing projection data by a system including a communications module, a projector, and at least one processor communicatively coupled to at least one non-transitory processor-readable storage medium, the method comprising:
   for a first row of an image raster representing an image to be projected:
      for a first portion of the first row:
         providing, by the at least one processor, a first set of at least two data sections, the at least two data sections in the first set each being alternative representations of the first portion of the first row;
         storing, by the non-transitory processor-readable storage medium, the first set of at least two data sections as a first portion of the projection data;
      for a second portion of the first row:
         providing, by the at least one processor, a second set of at least one data section, the at least one data section of the second set representing the second portion of the first row; and
         storing, by the non-transitory processor-readable storage medium, the second set of at least one data section as a second portion of the projection data;
      for a third portion of the first row:
         providing, by the at least one processor, a third set of at least two data sections, the at least two data sections of the third set each being alternative representations of the third portion of the first row; and
         storing, by the non-transitory processor-readable storage medium, the third set of at least two data sections as a third portion of the projection data; and
   transmitting, by the communications module, the projection data; and
   controlling, by the at least one processor, the projector to project an image based on the projection data.

2. The method of claim 1,
   wherein the providing, by the at least one processor, the first set comprises:
      generating, by the at least one processor, a first data section of the first set by interpolating between at least one pixel in the first portion of the first row and at least one pixel in a corresponding first portion of a row of the image raster spatially preceding the first row in the image raster; and
      generating, by the at least one processor, a second data section of the first set by interpolating between at least one pixel in the first portion of the first row and at least one pixel in a corresponding first portion of a row of the image raster spatially succeeding the first row in the image raster,
   wherein the providing, by the at least one processor, the second set comprises reading, by the at least one processor, the second portion of the first row of the image raster, and
   wherein the providing, by the at least one processor, the third set comprises:
      generating, by the at least one processor, a first data section of the third set by interpolating between at least one pixel in the third portion of the first row and at least one pixel in a corresponding third portion of the row of the image raster spatially preceding the first row in the image raster; and
      generating, by the at least one processor, a second data section of the third set by interpolating between at least one pixel in the third portion of the first row and at least one pixel in a corresponding third portion of the row of the image raster spatially succeeding the first row in the image raster.

3. The method of claim 2 wherein each operation of interpolating between at least one pixel in the first row and at least one pixel in a row of the image raster spatially preceding or spatially succeeding the first row in the image raster includes weighting pixel information of the at least one pixel in the first row more heavily than pixel information of the at least one pixel in the row preceding or succeeding the first row in the image raster.

4. The method of claim 1, the image raster including a second row which spatially precedes the first row in the image raster and a third row which spatially succeeds the first row in the image raster, each of the first row, the second row, and the third row comprising a respective first portion, a respective second portion, and a respective third portion,
   wherein the providing, by the at least one processor, the first set comprises:
      providing, by the at least one processor, a first data section of the first set by reading, by the at least one processor, the first portion of the second row of the image raster; and
      providing, by the at least one processor, a second data section of the first set by reading, by the at least one processor, the first portion of the third row of the image raster;

wherein the providing, by the at least one processor, the second set comprises reading, by the at least one processor, the second portion of the first row of the image raster; and wherein the providing, by the at least one processor, the third set comprises:

providing, by the at least one processor, a first data section of the third set by reading, by the at least one processor, the third portion of the second row of the image raster; and providing, by the at least one processor, a second data section of the third set by reading, by the at least one processor, the third portion of the third row of the image raster.

5. A method of controlling a projector, the projector including at least one non-transitory processor-readable storage medium communicatively coupled to at least one processor, the method comprising:

providing, by the at least one non-transitory processor-readable storage medium, projection data representing a plurality of rows of an image raster, the projection data including:

a first set of at least two data sections, the at least two data sections of the first set each being alternative representations of a first portion of a first row in the image raster;

a second set of at least one data section, the at least one data section of the second set representing a second portion of the first row in the image raster; and a third set of at least two data sections, the at least two data sections of the third set each being alternative representations of a third portion of the first row in the image raster;

generating, by the at least one processor, a data stream for a first display frame, wherein the generating, by the at least one processor, the data stream for the first display frame includes:

reading, from the at least one non-transitory processor-readable storage medium by the at least one processor, one data section of the at least two data sections of the first set;

reading, from the at least one non-transitory processor-readable storage medium by the at least one processor, the at least one data section of the second set; and reading, from the at least one non-transitory processor-readable storage medium by the at least one processor, one data section of the at least two data sections of the third set; and controlling, by the at least one processor, the projector to project an image based on the data stream for the first display frame.

6. The method of claim 5, further comprising:

generating, by the at least one processor, a data stream for a second display frame, wherein generating, by the at least one processor, the data stream for the second display frame includes:

reading, from the at least one non-transitory processor-readable storage medium by the at least one processor, another data section of the at least two data sections of the first set;

reading, from the at least one non-transitory processor-readable storage medium by the at least one processor, the at least one data section of the second set; and reading, from the at least one non-transitory processor-readable storage medium by the at least one processor, another data section of the at least two data sections of the third set; and controlling, by the at least one processor, the projector to project an image representing content of the data stream for the second display frame.

7. The method of claim 6, wherein:

the at least two data sections in the first set include a first data section of the first set at least partially representing an area of the image raster spatially preceding the first portion of the first row in the image raster, and a second data section of the first set at least partially representing an area of the image raster spatially succeeding the first portion of the first row in the image raster, the at least two data sections in the third set include a first data section of the third set at least partially representing an area of the image raster spatially preceding the third portion of the first row in the image raster, and a second data section of the first set at least partially representing an area of the image raster spatially succeeding the third portion of the first row in the image raster, reading, from the at least one non-transitory processor-readable storage medium by the at least one processor, one data section of the at least two data sections of the first set comprises reading the first data section of the first set, reading, from the at least one non-transitory processor-readable storage medium by the at least one processor, one data section of the at least two data sections of the third set comprises reading the second data section of the third set, reading, from the at least one non-transitory processor-readable storage medium by the at least one processor, another data section of the at least two data sections of the first set comprises reading the second data section of the first set, and reading, from the at least one non-transitory processor-readable storage medium by the at least one processor, another data section of the at least two data sections of the third set comprises reading the first data section of the third set.

8. The method of claim 5 wherein:

the projection data includes a respective data flag preceding each data section in the projection data; and each operation of reading a data section comprises the at least one processor reading the respective flag which precedes the respective data section and determining that the respective data section should be read according to a projection pattern.

9. The method of claim 5 wherein:

each of the at least two data sections in the first set has a first predetermined size;

each of the at least one data section in the second set has a second predetermined size;

each of the at least two data sections in the third set has a third predetermined size; and each operation of reading a data section comprises reading the respective data section according to the predetermined size of the respective data section.

10. The method of claim 5 wherein:

each data section is stored at a respective address in the at least one non-transitory processor-readable storage medium; and each operation of reading a data section comprises reading the respective data section according to the address of the respective data section.

11. A system for processing projection data and controlling a projector, the system including a projector, at least one processor, and at least one non-transitory processor-readable storage medium communicatively coupled to the at least one processor, the at least one non-transitory processor-readable storage medium having instructions stored thereon which when executed by the at least one processor cause the system to:
for a first row of an image raster representing an image to be projected:
for a first portion of the first row:
provide, by the at least one processor, a first set of at least two data sections, the at least two data sections in the first set each being alternative representations of the first portion of the first row;
store, by the at least one non-transitory processor-readable storage medium, the first set of at least two data sections as a first portion of the projection data;
for a second portion of the first row:
provide, by the at least one processor, a second set of at least one data section, the at least one data section of the second set representing the second portion of the first row; and
store, by the non-transitory processor-readable storage medium, the second set of at least one data section as a second portion of the projection data; and
for a third portion of the first row:
provide, by the at least one processor, a third set of at least two data sections, the at least two data sections of the third set each being alternative representations of the third portion of the first row; and
store, by the non-transitory processor-readable storage medium, the third set of at least two data sections as a third portion of the projection data;
generate, by the at least one processor, a data stream for a first display frame,
wherein the instructions which cause the at least one processor to generate the data stream for the first display frame cause the system to:
read, from the at least one non-transitory processor-readable storage medium by the at least one processor, one data section of the at least two data sections of the first set;
read, from the at least one non-transitory processor-readable storage medium by the at least one processor, the at least one data section of the second set; and
read, from the at least one non-transitory processor-readable storage medium by the at least one processor, one data section of the at least two data sections of the third set; and
control, by the at least one processor, the projector to project an image based on the data stream for the first display frame.

12. The system of claim 11 wherein the at least one non-transitory processor-readable storage medium has further instructions stored thereon, the further instructions when executed by the at least one processor cause the system to:
generate, by the at least one processor, a data stream for a second display frame, wherein the instructions which cause the at least one processor to generate the data stream for the second display frame cause the system to:
read, from the at least one non-transitory processor-readable storage medium by the at least one processor, another data section of the at least two data sections of the first set;
read, from the at least one non-transitory processor-readable storage medium by the at least one processor, the at least one data section of the second set; and
read, from the at least one non-transitory processor-readable storage medium by the at least one processor, another data section of the at least two data sections of the third set; and
control, by the at least one processor, the projector to project an image representing content of the data stream for the second display frame.

13. The system of claim 11 wherein the at least one processor comprises a single unified processor.

14. The system of claim 11 wherein the at least one processor comprises a projection data processor, a control data processor, and a projection controller, further wherein:
the instructions stored on the at least one non-transitory processor-readable storage medium include first instructions which when executed cause the projection data processor to provide the first set of at least two data sections, to provide the second set of at least one data section, and to provide the third set of at least two data sections,
the instructions stored on the at least one non-transitory processor-readable storage medium include second instructions which when executed cause the control data processor to generate the data stream for the first display frame, to read, from the at least one non-transitory processor-readable storage medium, one data section of the at least two data sections of the first set, to read from the at least one non-transitory processor-readable storage medium the at least one data section of the second set, and to read from the at least one non-transitory processor-readable storage medium one data section of the at least two data sections of the third set, and
the instructions stored on the at least one non-transitory processor-readable storage medium include third instructions which when executed cause the projector controller to control the projector to project the image based on the data stream for the first display frame.

15. The system of claim 14, further comprising:
a projection data sub-system which includes the projection data processor, a first non-transitory processor-readable storage medium of the at least one non-transitory processor-readable storage medium, and a first communications module; and
a control data sub-system which includes the control data processor, a second non-transitory processor-readable storage medium of the at least one non-transitory processor-readable storage medium, and a second communications module,
wherein the projection data sub-system is physically separate from the control data sub-system, and the first communications module and the second communications module provide communicative coupling between the projection data sub-system and the control data sub-system.

16. The system of claim 15 wherein the first communications module and the second communications module are wireless communications modules.

17. The system of claim 15 wherein the first communications module and the second communications module are wired communications modules.

18. The system of claim 15, wherein the first instructions are stored on the first non-transitory processor-readable storage medium and the second instructions are stored on the second non-transitory processor-readable storage medium.

* * * * *